(12) United States Patent
Calin et al.

(10) Patent No.: US 10,560,940 B2
(45) Date of Patent: Feb. 11, 2020

(54) INTELLIGENT TRAFFIC STEERING OVER OPTIMAL PATHS USING MULTIPLE ACCESS TECHNOLOGIES

(71) Applicant: Nokia Solutions and Networks Oy, Espoo (FI)

(72) Inventors: Doru Calin, Nabakaoan, NJ (US); Bongho Kim, Morganville, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 1 day.

(21) Appl. No.: 15/809,386

(22) Filed: Nov. 10, 2017

(65) Prior Publication Data
US 2019/0150150 A1  May 16, 2019

(51) Int. Cl.
*H04W 72/04* (2009.01)
*H04W 24/08* (2009.01)
*H04L 12/26* (2006.01)

(52) U.S. Cl.
CPC ....... *H04W 72/0453* (2013.01); *H04W 24/08* (2013.01); *H04L 43/0852* (2013.01); *H04L 43/0882* (2013.01); *H04L 43/16* (2013.01)

(58) Field of Classification Search
CPC .. H04W 72/0453; H04W 24/08; H04L 43/16; H04L 43/0882; H04L 43/0852
See application file for complete search history.

(56) References Cited

U.S. PATENT DOCUMENTS

| 2011/0119517 A1* | 5/2011 | Beeco | H04L 41/0677 713/340 |
| 2015/0071076 A1* | 3/2015 | Izhak-Ratzin | H04L 47/805 370/236 |
| 2016/0286438 A1* | 9/2016 | Weingertner | H04W 36/0022 |
| 2017/0134261 A1* | 5/2017 | Seo | H04L 12/66 |

(Continued)

OTHER PUBLICATIONS

S. Kanugovi et al, "Multiple Access Management Services", IETF draft-kanugovi-intrarea-mams-ptotocol-04, <https://datatracker.ietf.org/doc/draft-kanugovi-intarea-mams-protocol/>, Mar. 27, 2017, 16 pages.

(Continued)

*Primary Examiner* — Brian D Nguyen

(57) ABSTRACT

One or more processors in a communication system allocate a selected connectivity path from a plurality of connectivity paths supported by a plurality of access technologies. The selected connectivity path is allocated to a service flow between a communication device and a core network. One or more available access channels are assigned to the service flow for the selected connectivity path. Network conditions and performance of the service flow are monitored on the one or more available access channels. The selected connectivity path is modified based on the network conditions and the performance of the service flow seamlessly to the existing applications or service flows. In some cases, criteria for modifying the selected connectivity path are modified for a predetermined time interval in response to modifying the selected connectivity path, e.g., by modifying threshold (Continued)

values that are used to determine whether to modify the selected connectivity path based on a comparison of the threshold values to the network conditions or the performance of the service flow.

33 Claims, 14 Drawing Sheets

(56) References Cited

U.S. PATENT DOCUMENTS

2017/0135009 A1\* 5/2017 Ling ................... H04L 12/4633
2018/0254979 A1\* 9/2018 Scahill .................... H04L 45/24
2018/0309664 A1\* 10/2018 Balasubramanian ... H04L 45/38

OTHER PUBLICATIONS

S. Borst, A. O. Kaya, D. Calin, H. Viswanathan, "Dynamic Path Selection in 5G Multi-RAT Wireless Networks", in. Proc. of IEEE INFOCOM 2017, May 1-4, 2017, 9 pages.

\* cited by examiner

INTELLIGENT TRAFFIC STEERING OVER OPTIMAL PATHS USING MULTIPLE ACCESS TECHNOLOGIES

BACKGROUND

Communication systems support network connectivity via wired or wireless connections and current trends favor fixed-wireless convergence to support unified access across wired and wireless connections. Communication devices such as smart phones, tablets, and laptops are able to maintain concurrent connections to a network via multiple access technologies such as cellular technologies that operate in a licensed frequency band and other technologies that operate in unlicensed frequency bands. For example, user equipment can implement multiple access technologies according to Third Generation (3G) standards defined by the Third Generation Partnership Project (3GPP) such as Long-Term Evolution (LTE), Fourth Generation (4G) standards, Fifth Generation (5G) standards, 802.11 standards defined by IEEE such as Wi-Fi, or using other access technologies such as millimeter wave technologies. Some user equipment also support communication over wired connections such as digital subscriber line (DSL) connections, which can be used concurrently with wireless connections. Other types of communication devices such as devices that support machine-to-machine communication are also able to support multiple access technologies that can be used to maintain concurrent wireless connections.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
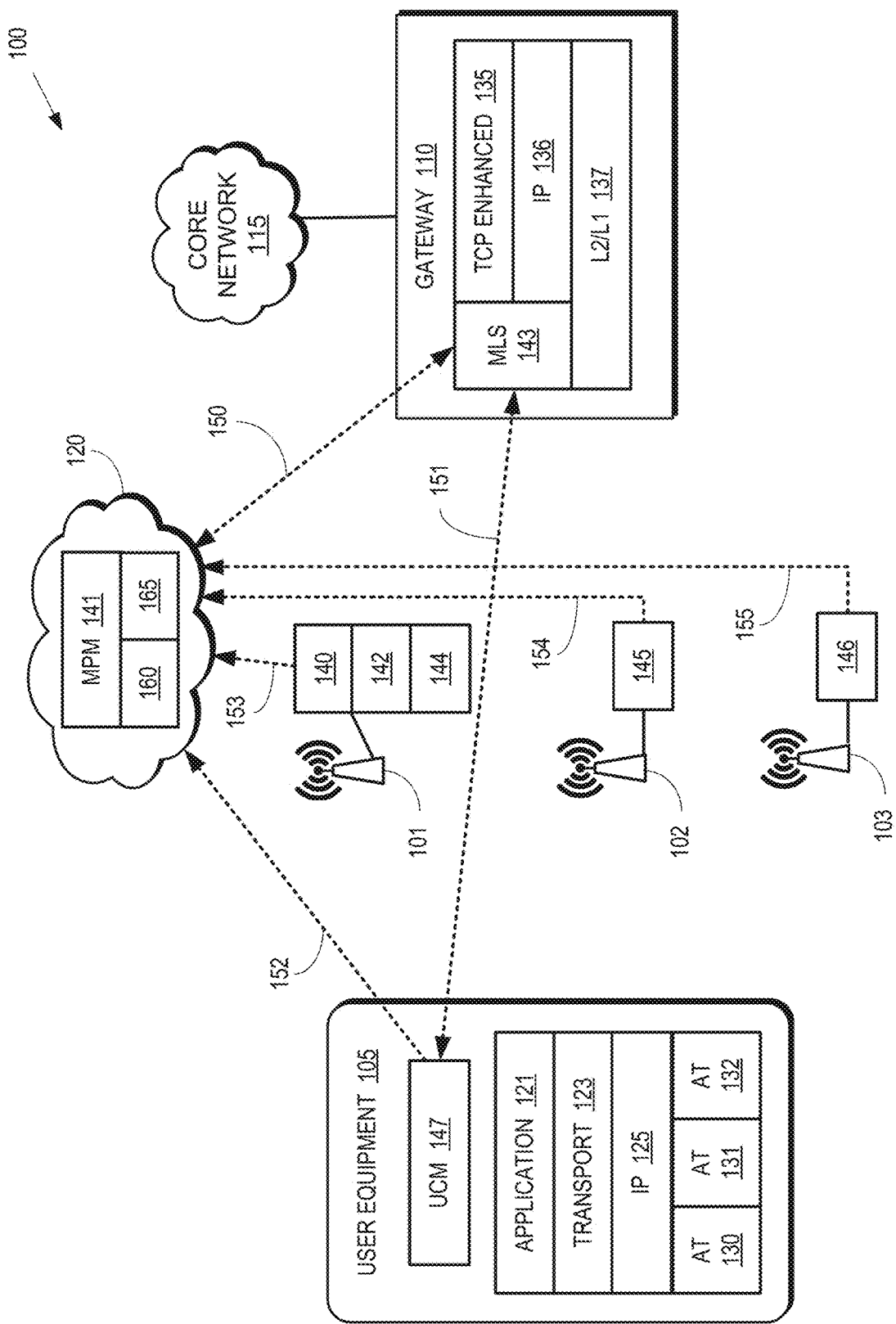
FIG. 1 is a block diagram of a first example of a communication system according to some embodiments.

Conventional communication systems implement different techniques to leverage the availability of multiple access technologies to provide an improved user experience. Systems that operate according to 3G/4G and Wi-Fi implement handover to support user mobility. For example, user equipment can be handed over from an LTE connection to a Wi-Fi connection in response to the user equipment detecting deteriorating signal quality on the LTE connection if an interworking mechanism is supported by the mobile network operator. Even if connectivity could be maintained using the handover mechanism, it requires disconnecting a communication session with the LTE connection and forming a new connection using the Wi-Fi connection, which may disrupt ongoing flows between the network and the user equipment. The primary goal of the handover mechanism is to maintain user's connectivity under mobility environment. Handover is not used to support optimal network connectivity, which aims at providing the highest quality of experience, including desirable throughput, low packet delay, and reliable connectivity.

Splitting flows across multiple interfaces provides another way to enhance user experience using multiple access technologies. For example, Hypertext Transfer Protocol (HTTP) range requests can be used to divide files for transmission over different network links and migrate data sessions from one link to another. However, this approach only works with HTTP applications and does not support other applications based on File Transfer Protocol (FTP), User Datagram Protocol (UDP), or HTTP Secure (HTTPS). For another example, multipath transmission control protocol (MPTCP) aggregates multiple TCP subflows that are conveyed over different network paths to the same end device. However, not all endpoints are MPTCP capable. Furthermore, even if an MPTCP proxy is used in the network and the user device supports the MPTCP protocol, the user packets bypass the proxy if the TCP packets are encrypted using IPSec because the TCP header information in the encrypted packet is invisible to the proxy. Multipath TCP does not support UDP traffic. For yet another example, IP packets could combine multiple network interfaces using network interface bonding. However, this approach may not support packet reordering mechanism if packets arrive out-of-order. Even though the IEEE 802.3ad standard specifies packet in-order delivery mode, it comes with a drawback, mandating all devices in the aggregate operate at the same speed and duplex. Furthermore, scaling up IP packet aggregation is difficult because new interfaces and hardware have to be provisioned locally, which can worsen the out-of-order packet delivery problem. The key objective for the aforementioned techniques is to provide higher throughput using throughput aggregation, but these approaches do not account for quality requirements of delay sensitive services.

FIGS. 1-16 disclose a heuristic, non-greedy approach to providing individual service flows (or subflows) terminated by wireless communication devices that support multiple access technologies with nearly proportionally fair resource allocations, while also satisfying per-flow quality-of-service (QOS) requirements. In some embodiments, one of a plurality of paths supported by a corresponding plurality of access technologies is selectively allocated to a flow (or subflow) based on at least one of an operator policy or a QOS requirement for the flow. For example, the flow can be allocated according to an operator policy, bandwidth availability, measured packet delays, or jitter associated with the plurality of paths. Once the path is allocated, available access channels are assigned to the flow. Performance of the flow on the assigned channel is monitored. In some embodiments, network conditions are also monitored. Path reselection is performed to modify the allocated path based on the monitored performance of the flow and the network conditions. For example, the flow can be switched to a different path associated with a different access technology in response to a performance metric falling below a threshold value. Flows that have been split across multiple access channels can be consolidated into a single flow.

Switching a flow from a first path that operates according to a first access technology to a second path that operates according to a second access technology does not necessarily immediately improve the performance of the flow. For example, switching a flow from a relatively slow network connection to a relatively fast network connection to achieve a target throughput may not immediately increase the throughput of the flow to the target throughput. Depending on the transport layer protocols used by the fast and slow networks, the timescale for increasing throughput along the newly selected high-speed network connectivity path may be longer than an estimated trigger time for performing a path switch. This may lead to a ping-ponging of the flow between the first and second paths during the ramping up time interval if the throughput along the newly selected path does not reach an expected target performance metric (e.g., a target throughput) within the trigger time.

Ping-ponging is avoided by monitoring progress towards the target performance metric, such as the target throughput. In some embodiments, criteria such as threshold values of the target performance metric are dynamically modified in response to path reselection. For example, a dynamic target throughput can be set to a relatively low value in response to the path reselection and then increased during a ramping up time interval. As long as a measured average throughput exceeds the dynamic target throughput, the path reselection is maintained. A new path reselection is performed in response to the performance metric failing to achieve the dynamic threshold value of the target performance metric. For example, a new path reselection is performed in response to a measured average throughput being less than a current value of the dynamic target throughput, which indicates that the previous path reselection is not improving performance for the flow.

FIG. 1 is a block diagram of a first example of a communication system 100 according to some embodiments. The communication system 100 includes base stations 101, 102, 103 (collectively referred to herein as "the base stations 101-103") that operate according to different access technologies. For example, the base station 101 operates according to 4G, 5G, and Wi-Fi standards, the base station 102 operates according to Wi-Fi standards, and the base station 103 supports millimeter wave communication. The base stations 101-103 provide wireless connectivity to one or more user equipment 105. The communication system 100 also includes a gateway 110 that supports communication between the base stations 101-103 and a core network 115. The communication system 100 also includes a cloud network 120.

The user equipment 105 implements an application layer 121 to support application layer interfaces, as well as resource sharing and remote file access. The user equipment 105 also implements a transport layer 123 that supports reliable transmission of data segments between communication endpoints including segmentation of packets, acknowledgment, and multiplexing. Some embodiments of the transport layer 123 implement a transmission control protocol (TCP) or a user datagram protocol (UDP). The user equipment 105 also implements a network layer such as an Internet protocol (IP) layer 125 that performs functions including addressing, routing, and traffic control for packet transmissions. The user equipment 105 further implements multiple access technologies 130, 131, 132, which are collectively referred to herein as "the ATs 130-132." For example, the AT 130 can be a cellular AT such as 4G or 5G, the AT 131 can operate according to a standard such as Wi-Fi in the unlicensed frequency band, and the AT 132 can support millimeter wave communication. More or fewer ATs which can include wired access technologies, are implemented in some embodiments of the user equipment 105.

The gateway 110 implements a transport layer 135 such as a TCP enhanced layer, an IP layer 136, and an L2/L1 layer 137 that supports reliable transmission of data frames between nodes connected by physical layer and the transmission and reception of bit streams over a physical medium.

The communication system 100 supports multi-connectivity path selection for services provided to the user equipment 105. The illustrated embodiment depicts examples of network elements and interfaces involved in the path selection algorithmic framework. The multi-connectivity path selection service as discussed in the context of a user equipment 105 that supports multimode connectivity and is in the same administrative domain of multiple access technologies, such as the ATs 130-132. The communication system 100 implements intelligent network controlled traffic steering to enable the highest quality-of-experience (QoE) to users while maintaining high network utilization, which is accomplished by continuously finding and adapting the best connectivity path per user per service flow.

Some embodiments of the communication system 100 therefore implement network elements that are configured to identify and assign the access technology that supports at least the minimum service requirements (e.g., targeted throughput and/or packet delay) and that is the least utilized among all the available access technologies. A link selection/load balancing algorithm that operates on a longer timescale ensures that the mobile devices are connected to the best link in average. Some embodiments of the intelligent network steering algorithm implemented in the communication system 100 use information that is actively measured (e.g., throughput and/or packet delay) whenever deemed necessary, along with radio conditions and radio resource measurements that are reported by the modules identified in this architecture, which are described below.

A Radio Connection Manager (RCM) 140 is hosted in the base station 101, which implements multiple access technologies and therefore supports tight integration of the multiple access technologies (e.g., 4G, 5G, Wi-Fi). The RCM 140 is responsible for decision making and control and is a possible placement for some embodiments of the intelligent network steering techniques disclosed herein. For example, the RCM 140 can be configured to support initial path selection of new incoming service flows as well as for intelligent traffic steering of existing service flows.

A Multi-Path Manager (MPM) 141 is implemented in the cloud network 120. Due to its placement in the network, which is deeper in the cloud compared to RCM 140, the MPM 141 has a broader network control span in comparison to the RCM 140, above and beyond the radio path (e.g., the network control span of the MPM 141 may extend control beyond radio access to include the transport segments of the network. For instance, the MPM 141 may reside in a Software Defined Network (SDN) controller, which enables such extended network controlled scope.

Multi-Link Schedulers (MLS) 142, 143 are hosted by the base station 101 and the gateway 110, respectively. The MLS 142, 143 operate on user data plane taking commands from controllers that are implemented in the RCM 140 and MPM 141 to ensure separation between control and user plane functions. The MLS 142, 143 are data plane modules that may or may not be physically collocated with a corresponding control plane module. In the illustrated embodiment, the MLS 142 is physically co-located with the RCM 140 and the MLS 143 is located in the gateway 110, while the MPM 141 is physically separated from the gateway 110. The MLS 142, 143 are triggered by the RCM 140 or the MPM 141 to perform user plane functions. For example, the MPM 141 or the RCM 140 selects a target access technology based on algorithmic intelligence and triggers MLS 142, 143 to establish a connectivity path through the selected access technology. The MLS 142, 143 measure network delay performance per mobile device and measures throughput per service flow along the user data routing path between the user equipment 105 and the base station 101. In response to instructions from the RCM 140 or the MPM 141, the MLS 142, 143 switch user data paths among the accessible access technologies. The MLS 142, 143 then provide user data packet in-order sequencing and removes duplicated packets.

Resource Measurement Managers (RMMs) 144, 145, 146 (collectively referred to herein as "the RMMs 144-146") are implemented in the base stations 101-103, respectively. The RMMs 144-146 are configured to monitor radio resource utilization of a specific access technology and reports the measurements to the MPM 141 and the RCM 140. The RMMs 144-146 are also configured to monitor uplink user data throughput per user per service flow over a specific access technology, and reports it to the MPM 141 and the RCM 140. The RMMs 144-146 are further configured to monitor uplink and downlink radio conditions per mobile device for all mobile devices connected to a specific access technology, which can include the user equipment 105. Information indicating the radio conditions includes a received signal strength indicator (RSSI), a signal to interference plus noise ratio (SINR), a modulation and coding scheme (MCS), and the like. The RMMs 144-146 configured to report indications of the radio conditions to the MPM 141 and the RCM 140. The RMMs 144-146 are also configured to generate and maintain statistics on the number of connected users and their uplink/downlink traffic for a specific access technology.

The user equipment 105 implements a User Connection Manager (UCM) 147, which is configured to establish a multi-access path selection management session to the MPM 141 or the RCM 140. The UCM 147 is also configured to monitor performance metrics such as downlink throughput or delay measurements for the user equipment 105 and reports the measured performance metrics to the MPM 141 and the RCM 140. The UCM 147 also provides downlink user data packet in-order sequencing and removes duplicate packets. The UCM 147 establishes an IP tunnel per access technology between the user equipment 105 and the node hosting the MPM 141 or the RCM 140. The UCM 147 also monitors the radio interface conditions (e.g., RSSI, SINR, MCS) for the user equipment 105 and transmits measurement reports to the MPM 141 or the RCM 140 with an adjustable reporting frequency. For example, the UCM 147 can report measurements periodically, in response to a request from the network, in response to a measured value of a performance network exceeding or falling below a threshold, and the like. The UCM 147 steers the uplink path either based on decisions made by the MPM 141 or the RCM 140, or based on a local decision taken at the UCM 147.

FIG. 1 also depicts conceptual network reference interfaces on the control plane: Mr 150, Ur 151, Um 152, Rm_lte 153, Rm_wifi 154, and Rm_5g 155. The network interfaces 150-155 are used to communicate among the corresponding network elements. In embodiments of the communication system 100 that are implemented according to software defined networking, the interfaces 150-155 act as control links between the various entities of a programmable network. In the illustrated embodiment, the MPM 141 is also connected to a wireless controller 160 and a network controller 165.

Some embodiments of the communication system 100 implement a "best-rate" path selection algorithm for multi-connectivity networks with various types of service flows such that the rates received by the various service flows under the "best-rate" path selection, in conjunction with local fair resource sharing at the individual access points, are close to globally Proportional Fair. Some embodiments of the communication system 100 therefore allocate a selected path from a plurality of paths supported by multiple access technologies. The selected path is allocated to a flow between the user equipment 105 and the core network 115. One or more available access channels are assigned to the flow for the selected path. Network conditions and performance of the flow are monitored on the one or more available access channels. The selected path is modified based on the network conditions and the performance of the flow. In some cases, criteria for modifying the selected path are modified for a predetermined time interval in response to modifying the selected path, e.g., by modifying threshold values that are used to determine whether to modify the selected path based on a comparison of the threshold values to the network conditions or the performance of the flow.

The algorithmic framework disclosed herein ensures that each individual service flow receives the best possible treatment, satisfying various per-flow specific QoS requirements such as bandwidth and/or delay, while all the other service flows are equally satisfied via a heuristic non-greedy approach. Furthermore, the algorithmic framework is designed to account not only for bandwidth sensitive applications, but also for delay sensitive applications, while accounting for protocol behaviour.

Some embodiments of the algorithm operate at various protocol layers in a communication network, as long as multiple access technologies are integrated at the respective layer (e.g., MAC, PDCP, IP, TCP). In some embodiments, the algorithmic intelligence is hosted in at least one network controller module, making it compatible with next generation programmable networks. Nevertheless, the algorithmic intelligence may be simply hosted in a multi-link scheduler, which is responsible for scheduling service flows across multiple access technologies. In some embodiments, at least one network controller is involved in the path computation based on collected and available information from at least one network node. The granularity for path selection/reselection enables intelligent network controlled traffic steering per user/device, per application, per service flow and per service sub-flow. More specifically, the path selection algorithmic framework allows different applications (e.g., video conferencing, chatting applications, Internet Gaming, and the like) to or from the same user/device to use different connectivity paths, including paths mapped to different access technologies, simultaneously. The path selection algorithmic framework estimates the performance impact that the addition of a new service flow would have on the other established and ongoing service flows, hence deciding on accepting/rejecting a new service flow. As a result of the algorithmic intelligence, the most suitable access technology is selected/reselected seamlessly and on a continuous basis (e.g., frequency of selection/reselection is a parameter of the algorithmic framework).

Embodiments of the path selection algorithm disclosed herein can account for several significant challenges faced by conventional communication systems. For example, source bit rate may change without informing the network layer of reason. The path selection algorithm framework can be made aware of such source related fluctuations and separate them out from other potential disturbances in the network. For another example, traffic flows often pass through network elements (e.g., routers) which do not interact/report with the network controller(s). Some necessary cross-layer information is not available through standard interfaces on access technologies (e.g., LTE, Wi-Fi). Conventional user equipment is modified, e.g., to incorporate the UCM 147, and therefore embodiments of the past selection technique disclosed herein are minimal or lightweight to alleviate the dependency on the mobile vendors and privilege a network based solution for traffic steering. In some cases, the TCP layer responds to network conditions independently, causing havoc. Furthermore, some embodiments of the proposed technique take into account information such as knowledge of the end-user devices (e.g., Operating System (OS), device capabilities, and the like), knowledge of application requirements (e.g., bandwidth, latency, and the like), and knowledge of network conditions (e.g., utilization level per access technology).

Figure 2:
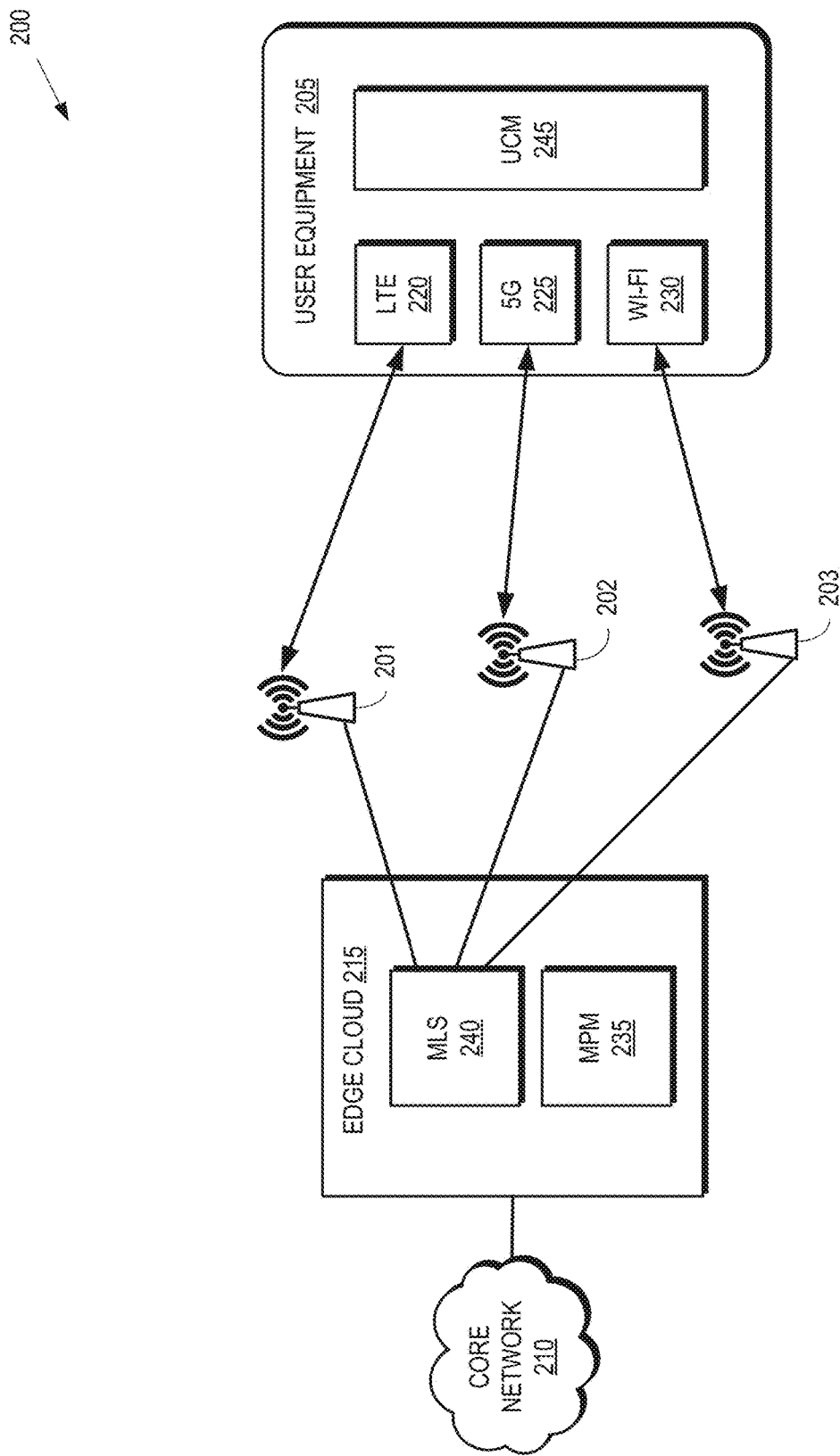
FIG. 2 is a block diagram of a second example of a communication system that implements intelligent path selection according to some embodiments.

FIG. 2 is a block diagram of a second example of a communication system 200 that implements intelligent path selection according to some embodiments. The communication system 200 includes base stations 201, 202, 203 (collectively referred to herein as "the base stations 201-203") that operate according to different access technologies. For example, the base station 201 is a multi-access technology node that operates according to 4G, 5G, and Wi-Fi standards, the base station 202 operates according to millimeter wave communication, and the base station 203 supports Wi-Fi standards. The base stations 201-203 provide wireless connectivity to one or more user equipment 205. In the illustrated embodiment, the base stations 201-203 provide wireless connectivity to a core network 210 via an edge cloud 215. For example, the edge cloud 215 can be implemented as a mobile edge computing (MEC) device.

The user equipment 205 implements a transceiver (or transmitters and receivers) according to multiple access technologies. For example, the user equipment 205 implements an LTE transceiver 220, a 5G transceiver 225, and a Wi-Fi transceiver 230. The transceivers 220, 225, 230 are able to establish concurrent wireless connections with the corresponding base stations 201-203. In the illustrated embodiment, an MPM 235 and an MLS 240 are implemented in the edge cloud 215. A UCM 245 is implemented in the user equipment 205, e.g., as software executing on a processor implemented in the user equipment 205. Some embodiments of the communication system 200 are therefore able to implement intelligent path steering to selectively allocate paths supported by different access technologies to flows or sub-flows between the user equipment 205 and the core network 210.

Intelligent traffic steering as implemented in some embodiments of the communication system 100 and the communication system 200 utilize several heuristic concepts. A fast path switching algorithm is hosted on MPM/RCM modules, using user throughput, network delay and radio condition measurements to determine the suitability of an access technology and its performance. The UCM implemented by a user equipment can request fast path switching to preserve a minimum QoE level. The system generates a centralized view of the network load and user performance, which is available at MPM/RCM through a network controller. The UCM supports passive user data downlink throughput measurement and the RMM, MPM, and RCM support passive uplink throughput measurement. Uplink and downlink packet delay measurements are performed per access technology, per mobile device and per service flow using an active probing mechanism through MPM/RCM and UCM. Jitter measurements can also be performed. The system supports radio resource utilization monitoring and reporting by RMM to MPM/RCM for available bandwidth and network congestion level estimation, radio resource availability estimation and reporting from a particular mobile device to MPM/RCM, if such information is not available from a RMM entity, and packet reordering function at UCM for downlink user data traffic and at MPM/RCM for uplink user data traffic.

Some embodiments of path selection performed in the communication systems 100, 200 include congestion detection over the connected access technologies. The UCM (for downlink traffic) and MPM/RCM (for uplink traffic) monitor the service performance for a target Class-i connection and report to the MPM/RCM whenever the measured performance gets degraded below a quality threshold. In some cases, values of the measured performance metrics trigger MPM/RCM to engage in a path switching procedure. The RMM modules that are part of the radio base stations (e.g., eNB for LTE and Wi-Fi APs) report their resource availability (i.e. congestion information) to the MPM/RCM. For example, an eNB monitors the utilization of LTE channels (e.g., PDSCH, PUSCH, PDCCH and PUCCH) and calculates in turn a weighted average utilization. In some embodiments, if the level of available resources (e.g., the number of physical resource blocks, PRBs) falls below a threshold target, the eNB starts reporting the measured level of available resources to MPM/RCM. The threshold target for starting reporting and the actual frequency of such reporting depend on the targeted sensitivity and desired agility of the dynamic path reselection. Alternatively, if an eNB does not have such information, the values of the performance metrics can be estimated. In some embodiments, if a measured idle airlink time level at a Wi-Fi access point falls below a threshold time target, the Wi-Fi access point starts reporting the measured idle airlink time to the MPM/RCM. The threshold time target for starting reporting and the actual frequency of such reporting depend on the targeted sensitivity and desired agility of the dynamic path reselection. Alternatively, if a Wi-Fi access point does not have such information, the performance metrics can be estimated.

Figure 3:
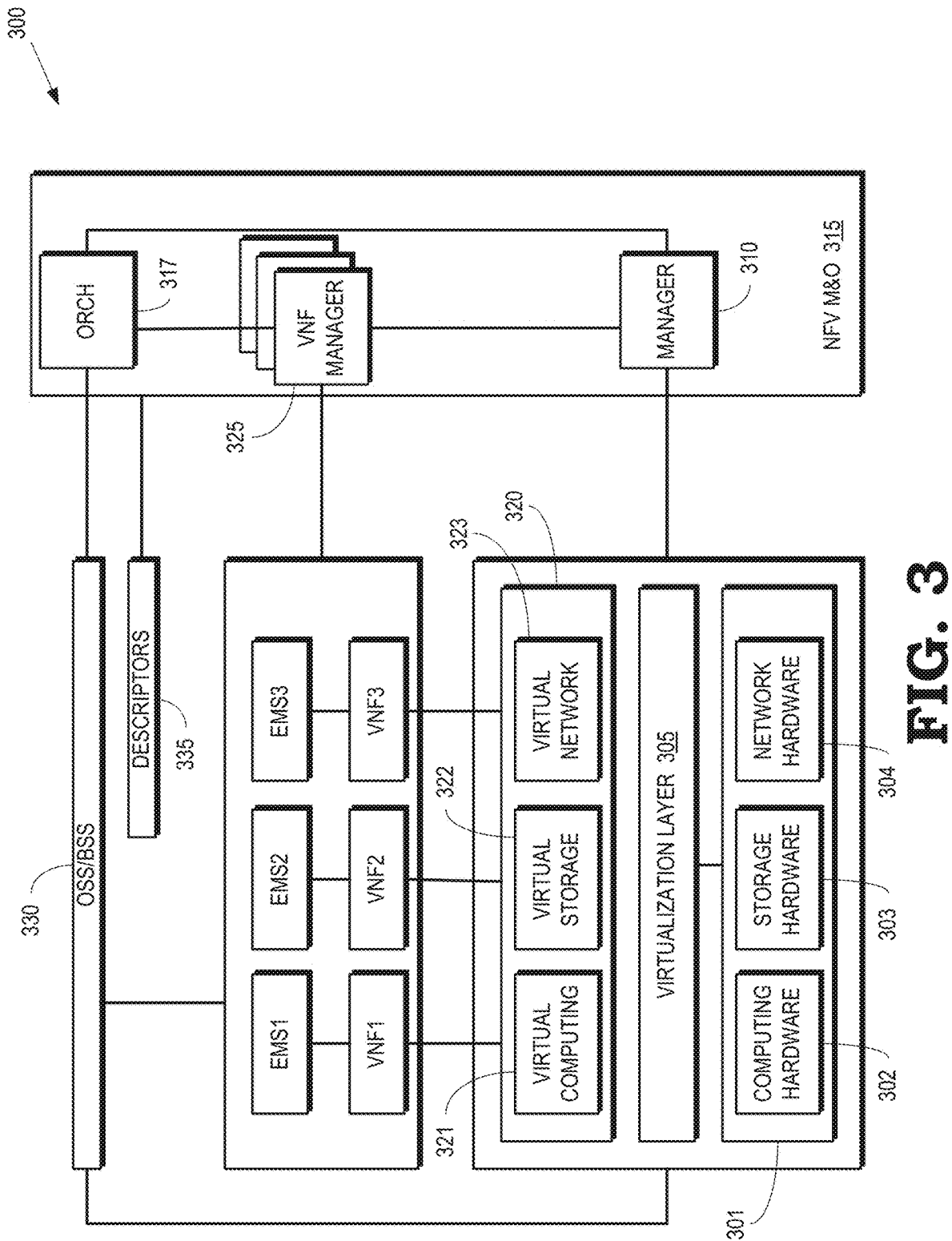
FIG. 3 is a block diagram of a network function virtualization (NFV) architecture according to some embodiments.

FIG. 3 is a block diagram of an NFV architecture 300 according to some embodiments. The NFV architecture 300 is used to implement some embodiments of the communication system 100 shown in FIG. 1 and the communication system 200 shown in FIG. 2. The NFV architecture 300 includes hardware resources 301 including computing hardware 302, storage hardware 303, and network hardware 304. The computing hardware 302 includes one or more processors, the storage hardware 303 includes one or more memories, and the network hardware 304 includes one or more transceivers, transmitters, receivers, or other interfaces. A virtualization layer 305 provides an abstract representation of the hardware resources 301. The abstract representation supported by the virtualization layer 305 can be managed using a virtualized infrastructure manager 310, which is part of the NFV management and orchestration (M&O) module 315. Some embodiments of the manager 310 are configured to collect and forward performance measurements and events that may occur in the NFV architecture 300. For example, performance measurements may be forwarded to an orchestrator (ORCH) 317 implemented in the NFV M&O 315. The hardware resources 301 and the virtualization layer 305 implement virtual resources 320 including virtual computing resources 321, virtual storage resources 322, and virtual networking resources 323.

Virtual networking functions (VNF1, VNF2, VNF3) run over the NFV infrastructure (e.g., the hardware resources 301) and utilize the virtual resources 320. For example, the virtual networking functions (VNF1, VNF2, VNF3) may be implemented using virtual machines supported by the virtual computing resources 321, virtual memory supported by the virtual storage resources 322, or virtual networks supported by the virtual network resources 323. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 325 that exchanges information and coordinates actions with the manager 310 or the orchestrator 317.

The NFV architecture 300 may include an operation support system (OSS)/business support system (BSS) 330. The OSS/BSS 330 deals with network management including fault management using the OSS functionality. The OSS/BSS 330 also deals with customer and product management using the BSS functionality. Some embodiments of the NFV architecture 300 use a set of descriptors 335 for storing descriptions of services, virtual network functions, or infrastructure supported by the NFV architecture 300. Information in the descriptors 335 may be updated or modified by the NFV M&O 315.

The NFV architecture 300 is used to implement network slices that provide control plane functions or user plane functions which are implemented in some embodiments of the communication system 100 shown in FIG. 1 and the communication system 200 shown in FIG. 2. A network slice is a complete logical network that provides communication services and network capabilities, which can vary from slice to slice. User equipment can concurrently access multiple slices that support multiple service flows between a core network and the user equipment. Some embodiments of user equipment provide Network Slice Selection Assistance Information (NSSAI) parameters to the network to assist in selection of a slice instance for the user equipment. A single NSSAI may lead to the selection of several slices. The NFV architecture 300 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

Figure 4:
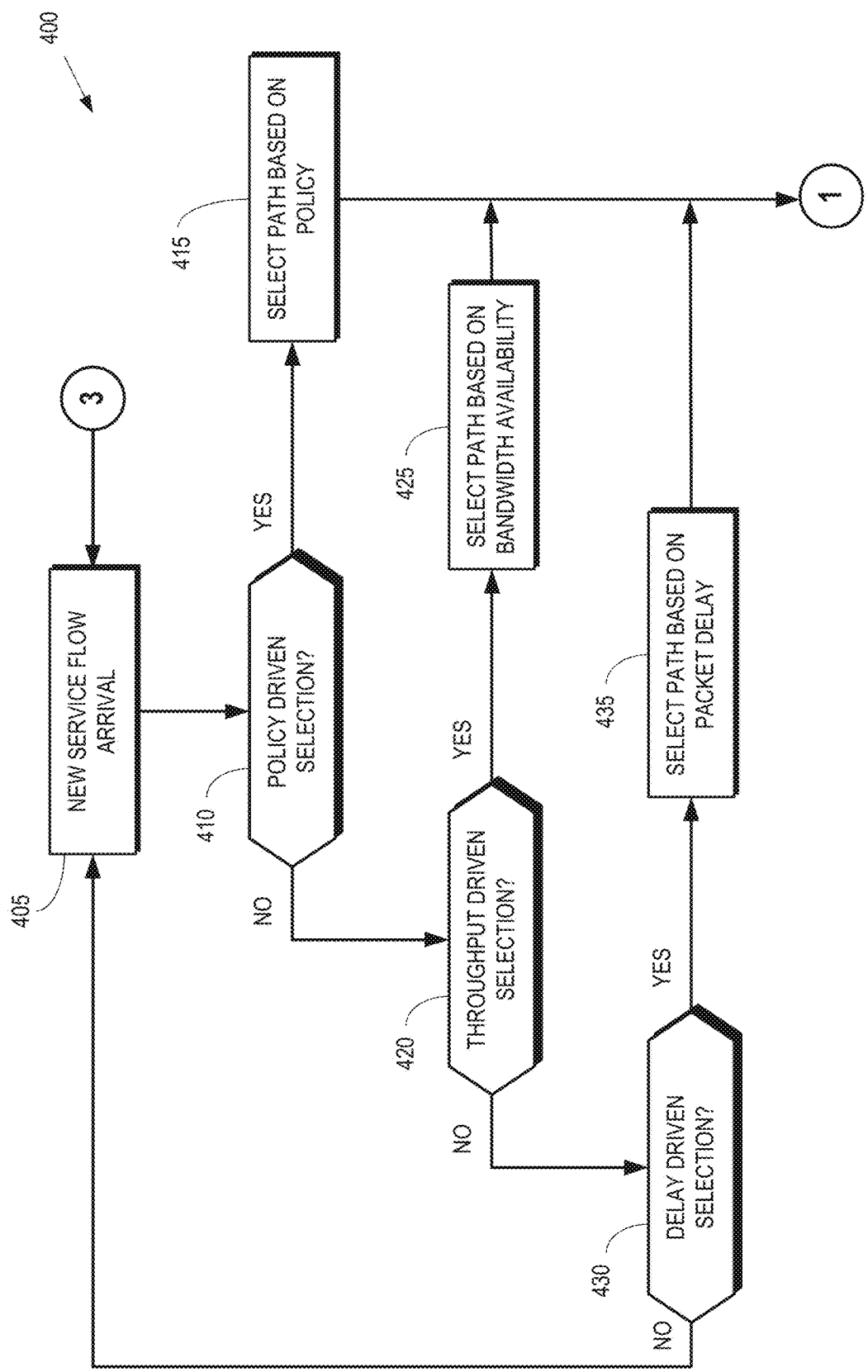
FIG. 4 is a flow diagram of a first portion of a method of selecting an initial path for a new service flow in a communication system that supports multiple access technologies according to some embodiments.

FIG. 4 is a flow diagram of a first portion 400 of a method of selecting an initial path for a new service flow in a communication system that supports multiple access technologies according to some embodiments. The method is implemented in a network controller such as some embodiments of the RCM 140 or the MPM 141 shown in FIG. 1 or the MPM 235 shown in FIG. 2.

At block 405, a new connection request is triggered upon the arrival of a new service flow.

At decision block 410, the network controller checks if the path selection is a policy driven selection. For example, the network controller can determine whether the path selection is controlled by a policy set by a network operator. If so, the method flows to block 415. If not, the method flows to decision block 420 and the network controller proceeds with selecting the initial path based on QoE criteria, such as bandwidth or delay requirements for the new service flow.

At block 415, the network controller selects the initial path according to policies such as service class, service cost, service priority or load balancing. The network policies may be set up by a mobile network operator and may be locally configured by a client (e.g., UCM) at a mobile device or by the network through Congestion and Admission Control (CAC) for the selected access technology upon the arrival of the new service flow. This option ensures a faster service flow connection set up time if the targeted access technology is able to provide the necessary network resource(s) for the incoming service flow.

If the method flows from the decision block 410 to the block 420, the network controller performs QoE based path selection. In the illustrated embodiment, path selection is performed on the basis of either throughput or delay along the selected path. However, some embodiments of the network controller implement a combined throughput/delay QoE criterion. Furthermore, other QoE criteria are used to evaluate the quality of a given service flow and added to the decision tree of the algorithmic logic in some embodiments of the network controller. The network controller utilizes measurement reports from all available access channels for the new service flow. In the interest of clarity, the method is discussed below in the context of an embodiment in which an LTE eNB and a Wi-Fi access point support K classes of service flows (e.g., segregated by geographical areas and different traffic characteristics). The following parameters are used in this description:

Thp_i: the minimum throughput rates (e.g., in Mbps) required for a service flow of class-i.

Delay_i: the maximum radio access packet Round Trip Time (RTT) delay (e.g., in ms) for a service flow of class-i.

LTE_spare_resources: total air-link resources (i.e. available Physical Resource Blocks (PRBs)) not being used, that may be allocated to a new service flow.

Wi-Fi_spare_resources: total air-link resources (i.e. idle-time) not being used, that may be allocated to a new service flow.

LTE_available_bw: this is estimated per UE, based on the UE's specific radio conditions, which provides an estimate for the Modulation and Coding Scheme (MCS) to be used. LTE_spare_resources together with mobile device's specific MCS determine LTE_available_bw for the respective mobile device.

Wi-Fi_available_bw: this is estimated per Wi-Fi client based on the client's radio condition, which provides an estimate for the MCS to be used. Wi-Fi_spare_resources together with the client's specific MCS determine the Wi-Fi_available_bw for the respective client.

LTE_Pkt_delay: this is the measured RTT through the LTE access technology between the mobile device and the anchor node (e.g., anchor GW).

Wi-Fi_Pkt_Delay: this is the measured RTT through the Wi-Fi access technology between the Wi-Fi client and the anchor node (e.g., anchor GW).

At the decision block 420, the network controller checks if the path selection decision is a throughput driven selection based on a throughput requirement for the new service flow. If so, the method flows to block 425. Otherwise, the method flows to decision block 430.

At block 425, the network controller performs path selection based on throughput measurements (i.e. Thp_i) over the available interfaces.

At decision block 430, the network controller determines whether the path selection decision is a delay driven selection based on a delay requirement for the new service flow. If so, the method flows to block 435. Otherwise, the method flows to block 405. Some embodiments of the network controller consider other QoE requirements in addition to throughput and delay. In that case, the portion 400 method includes additional branches to account for the additional QoE requirements.

At block 435, the network controller performs the path selection based on delay measurements (i.e. Delay_i) over the available interfaces.

After completing any of blocks 415, 425, 435, the portion 400 of the method flows to node 1.

Figure 5:
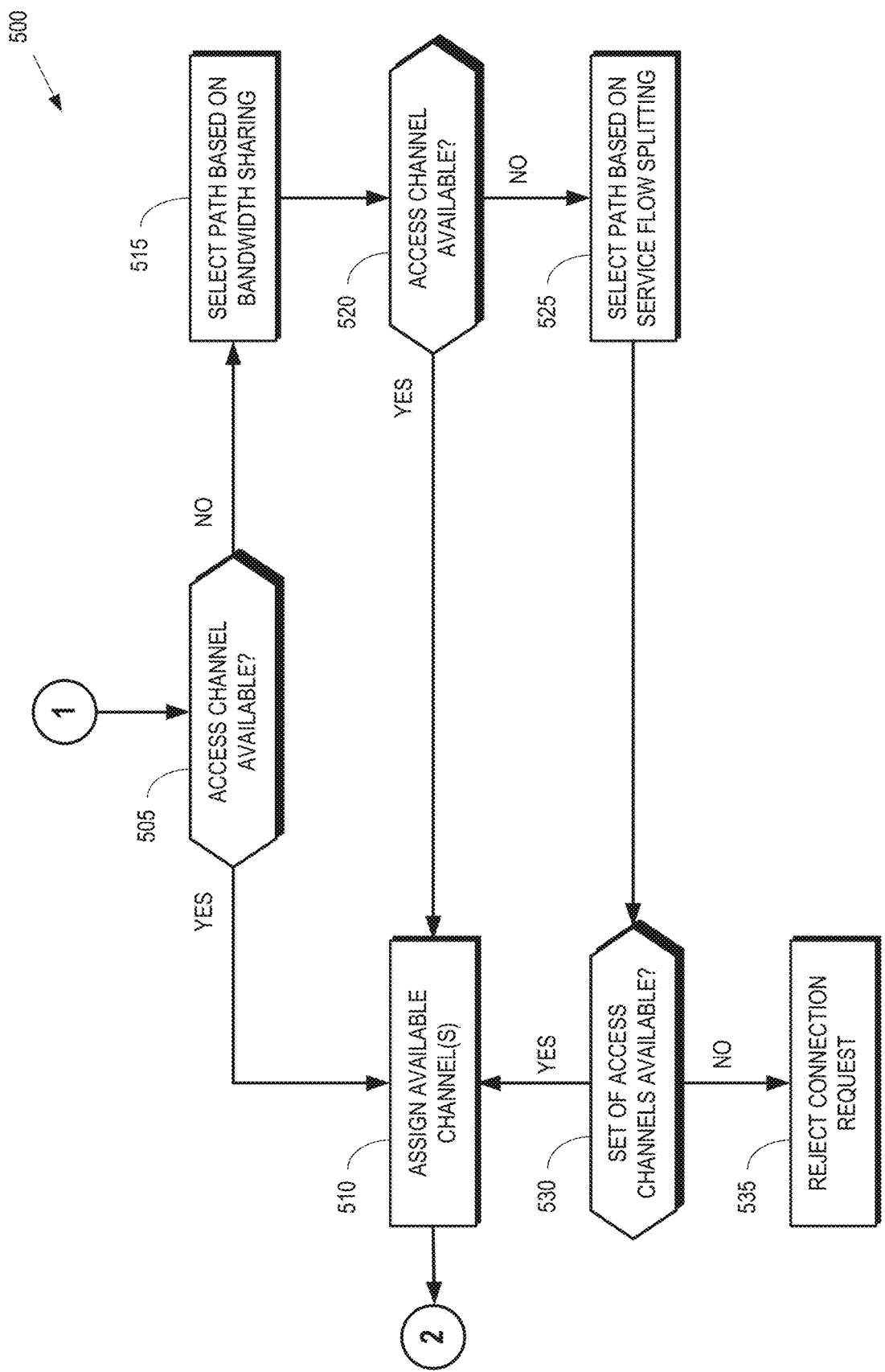
FIG. 5 is a flow diagram of a second portion of a method of selecting an initial path for a new service flow in a communication system that supports multiple access technologies according to some embodiments.

FIG. 5 is a flow diagram of a second portion 500 of a method of selecting an initial path for a new service flow in a communication system that supports multiple access technologies according to some embodiments. The method is implemented in a network controller such as some embodiments of the RCM 140 or the MPM 141 shown in FIG. 1 or the MPM 235 shown in FIG. 2. The second portion 500 of the method begins at node 1, which links the second portion 500 to the first portion 400 of the method shown in FIG. 4.

At block 505, the network controller identifies any access channels that are available to connect to the mobile device. The available access channels are determined based on defined QoE criteria, which can include an offer to QOS per application class such as throughput or packet delay, jitter, radio channel conditions, numbers of connected devices, numbers of active devices, numbers of active sessions, radio resource availability or utilization levels, mobile device mobility, mobile device capability, and the like. For example, an access channel is considered available if it has sufficient bandwidth and/or acceptable latency to accommodate the new service flow. In some embodiments, the condition "and" is used when both bandwidth and latency need to be satisfied, while the condition "or" is used when either the bandwidth or the latency needs to be satisfied as part of the QoE criteria.

In some embodiments that implement LTE and Wi-Fi access technologies, the network controller assigns the service flow to the LTE network if:

(Thp_$i$<LTE_Available_$bw$ and
LTE_Available_$bw$>Wi-Fi_Available_$bw$)

AND/OR (Delay_$i$>LTE_Pkt_delay and LTE_Pkt_delay<Wi-Fi_Pkt_delay)

Otherwise, the network controller assigns the service flow to the Wi-Fi network if:

(Thp_$i$<Wi-Fi_Available_$bw$ and
Wi-Fi_Available_$bw$>LTE_Available_$bw$)

AND/OR (Delay_$i$>Wi-Fi_Pkt_delay and
Wi-Fi_Pkt_delay<LTE_Pkt_delay)

If the network controller determines that at least one access technology is available, the method flows to block 510, otherwise the method flows to block 515.

At block 510, the network controller assigns the new service flow to at least one access channel that is selected out of the set of available access channels. In some embodiments, the network controller assigns one or more access channels to the new service flow based on a priority if multiple access channels are found available and a priority policy is implemented among the available access channels with respect to some services (e.g., Wi-Fi gets selected over LTE for best effort traffic and LTE gets selected over Wi-Fi for interactive streaming video traffic). In some embodiments, the network controller assigns the access channel that has the most available resources. The method then flows to node 2.

At block 515, the network controller has determined that none of the access channels has enough spare resources to support the service requirements (Thp_i and/or Delay_i) for the new service flow by itself. However, the new incoming service flow may be supported on a single access channel by taking some bandwidth away from either all or a subset of other ongoing service flows, as long as the respective QoS/QoE of all the affected ongoing service flows is not adversely impacted. In the illustrated embodiment, the network controller evaluates the available access channels to find out the available access channel with the largest bandwidth that can be released from another ongoing service flow without violating the QoE requirements of any already established and ongoing service flows. In some cases, a single service flow consumes the entire bandwidth of the access channel that has the most sharable bandwidth. In such cases, the access channel does not have spare resources and the initial path selection mechanism described herein would appear to be unable to allocate resources for the new incoming service flow. Nevertheless, the incoming service flow may be assigned to the access channel by sharing the access channel's resources among all the service flows carried out on the access channel. For example, protocols such as TCP would naturally converge to such behavior. Furthermore, if the network resources are shared fairly among all the service flows of the same access channel, then each service flow may end up using an equal amount of network resources.

On this premise, at decision block 520, the network controller determines whether the equally shared network resources are sufficient to meet the service requirements of the already established and ongoing service flows while providing sufficient quality to the new incoming service flow as well. If so, the method flows to block 510 and the network controller assigns new incoming service flow to the access channel and the method flows to node 2. If the network controller determines that there are insufficient resources to meet the service requirements of the ongoing service flows and the new incoming service flow, the method flows to decision block 525.

At block 525, the network controller was not able to find sufficient bandwidth in any of the access channels to accommodate the new service flow. The network controller therefore attempts to distribute the packets in the incoming new service flow across multiple access channels concurrently by dedicating a fraction of the bandwidth of all or a subset of the access channels to the new service flow. This is referred to herein as path splitting or service flow splitting. The network controller selects a suitable set of access channels such that the aggregate throughput across the access channels meets the targeted throughput requirement, Thp_i, of the new service flow. Similarly, traffic of the incoming new service flow that is split into the other access channels must not violate the delay requirement, Delay_i, of the new service flow. In some embodiments, splitting the service flow across the plurality of access channels is performed to meet a target end-to-end packet delay, a jitter requirement of the service flow, or a combination thereof.

At decision block 530, the network controller determines whether a set of access channels are available to support the QoE requirements of the new service flow. If so, the method flows to block 510 and the new incoming service flow is assigned to the set of access channels. If not, the method flows to block 535.

At block 535, the network controller has determined that there is neither a single access channel nor a set of access channels that can be assigned to the new service flow to meet the quality requirements of the new service flow. The network controller therefore rejects the connection request for the new service flow.

Figure 6:
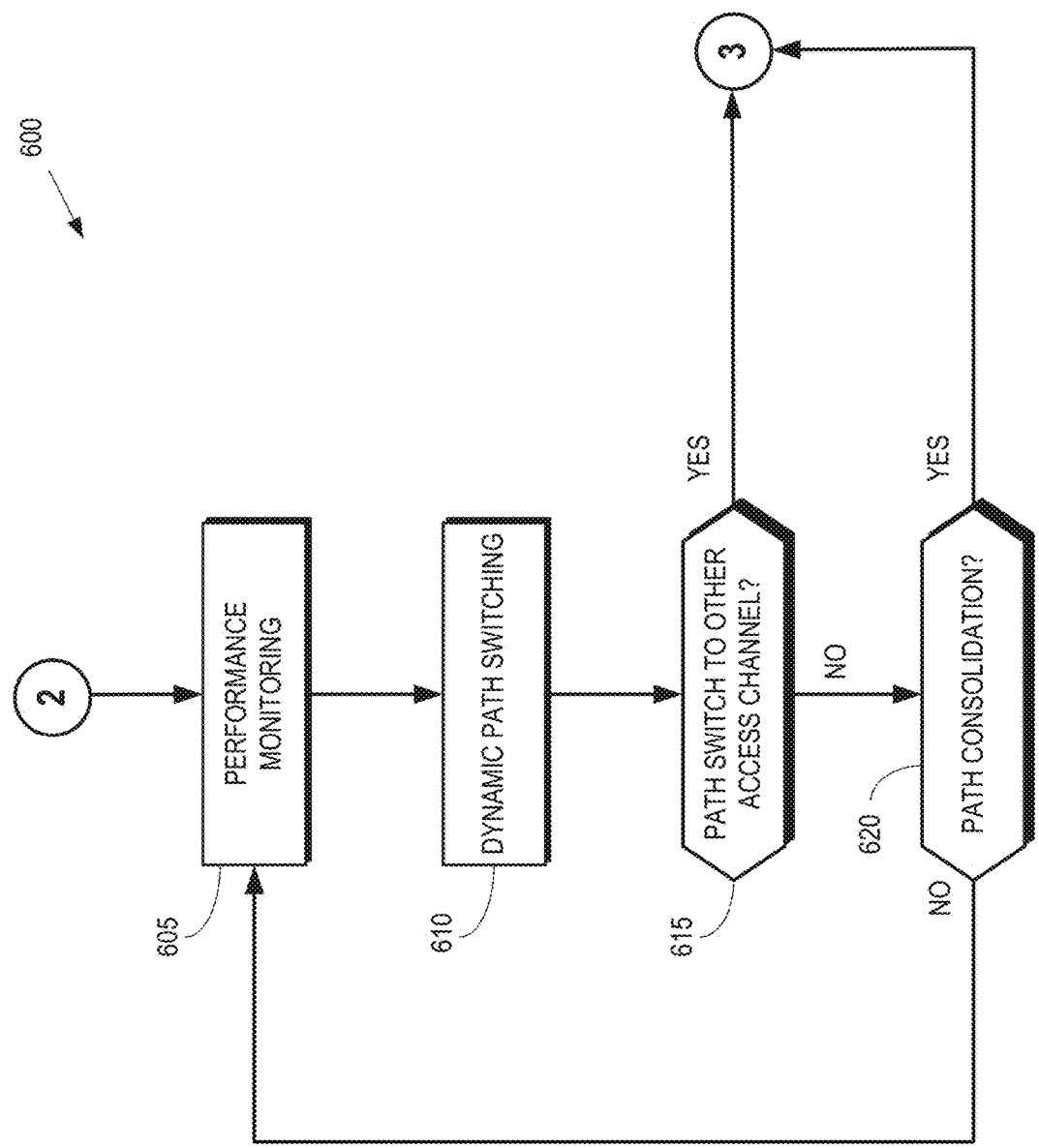
FIG. 6 is a flow diagram of a method of performance monitoring and dynamic path switching in a communication system that supports multiple access technologies according to some embodiments.

FIG. 6 is a flow diagram of a third portion 600 of a method of performance monitoring and dynamic path switching in a communication system that supports multiple access technologies according to some embodiments. The method is implemented in a network controller such as some embodiments of the RCM 140 or the MPM 141 shown in FIG. 1 or the MPM 235 shown in FIG. 2. The third portion 600 of the method begins at node 2, which links the third portion 600 to the second portion 500 of the method shown in FIG. 5. Initial path selection has therefore been performed by the network controller prior to beginning the method 600, e.g., according to the method illustrated in FIGS. 4 and 5.

At block 605, the network controller monitors the performance of a service flow. Monitoring performance of the service flow includes receiving feedback from network entities that includes measurements of performance metrics performed by the network entities, such as UCM, MLS, RCM, MPM, and the like. For example, once a new service flow is assigned either to a single access channel or to multiple access channels according to the method illustrated in FIGS. 4 and 5, the new service flow is continuously monitored for its performance. Examples of performance metrics that are measured include downlink throughputs, uplink throughputs, packet delays, available bandwidth and radio conditions, and the like.

At block 610, the network controller monitors network conditions, e.g., using information collected by network entities such as UCM, MLS, RCM, MPM, and the like. Examples of the information indicative of network conditions include an offered QoS per application/service class (e.g., throughput/packet delay), radio channel conditions, a number of connected devices, a number of active sessions, radio resource availability and utilization levels, mobile device mobility and mobile device capability, and the like. If the monitored performance or network conditions deteriorate for an established service flow, the network controller triggers a path switching procedure to avoid violating the QoS requirements of the affected service flows.

At decision block 615, the network controller determines whether a path reselection or path switching procedure should be triggered for an established service flow due to the performance degradation of the established service flow. Some embodiments of the network controller determine whether to perform path reselection or path switching by comparing one or more quality metrics (e.g., measured throughput and/or measured intra-packet delay of the service flow) to a reference quality threshold. If the network controller determines that path reselection or path switching is to be performed, the method 600 flows to node 3, which links the method 600 to the portion 400 of the method illustrated in FIG. 4. If the network controller determines that path reselection or path switching is not to be performed, the method 600 flows to decision block 620.

At decision block 620, the network controller determines whether path consolidation should be performed. For example, in addition to the service performance degradation considerations, the frequency of occurrence of service flow splitting across multiple access channels can be used to trigger the procedure for path reselection with the goal of consolidating and aggregating the split flows back into a single service flow. Path consolidation therefore reduces the number of access channels serving a single service flow. If the network controller determines that one or more split service flows are to be consolidated, the method 600 flows to node 3. Otherwise, the method 600 flows to block 605 and continues performance monitoring.

Figure 7:
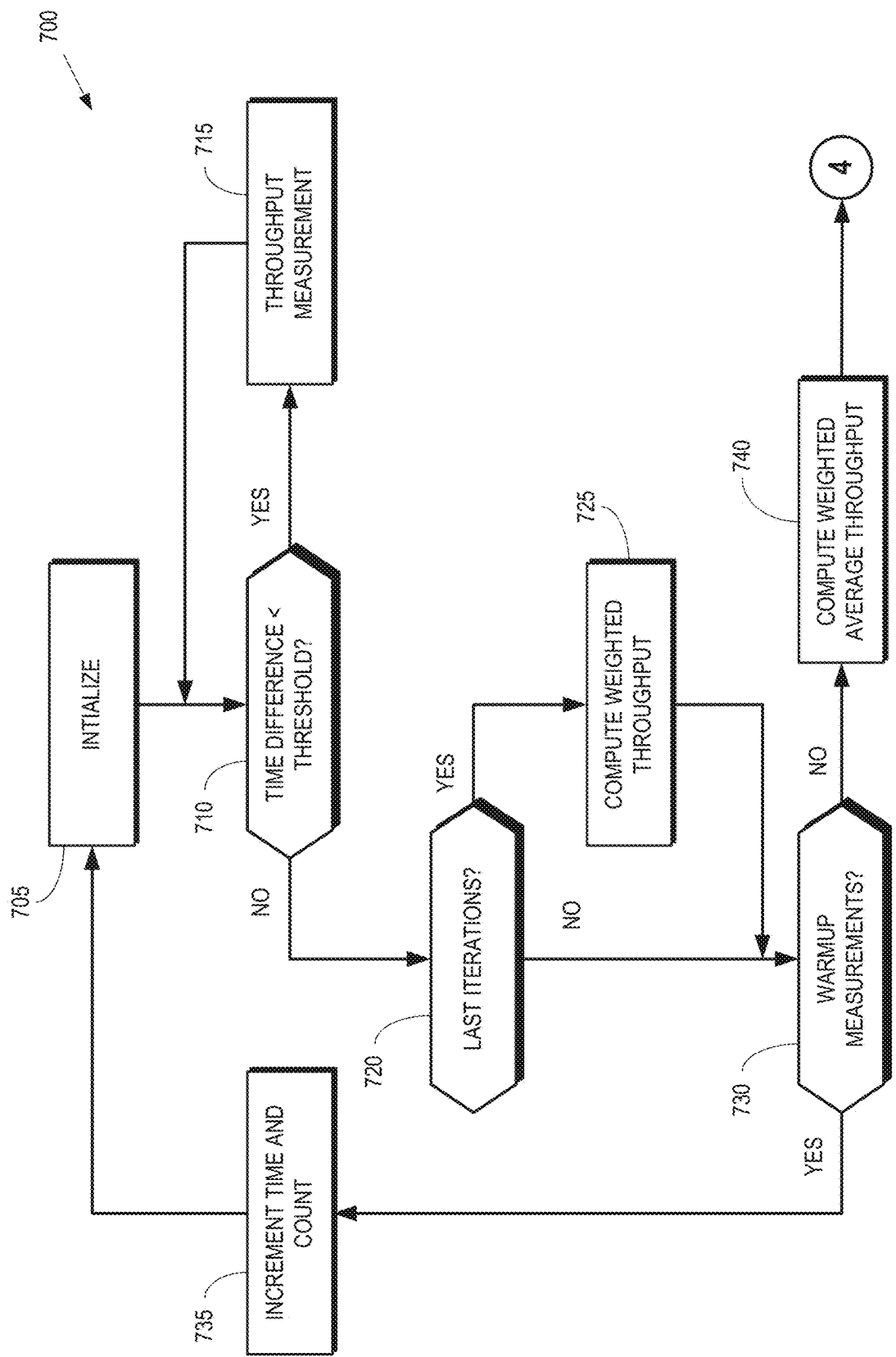
FIG. 7 is a flow diagram of a first portion of a method of dynamically modifying criteria for performing path reselection or path consolidation in a communication system that supports multiple paths using multiple access technologies according to some embodiments.

FIG. 7 is a flow diagram of a first portion 700 of a method of dynamically modifying criteria for performing path reselection or path consolidation in a communication system that supports multiple paths using multiple access technologies according to some embodiments. The method is implemented in a network controller such as some embodiments of the RCM 140 or the MPM 141 shown in FIG. 1 or the MPM 235 shown in FIG. 2. In the illustrated embodiment, the criteria for performing path reselection or path consolidation are represented as a throughput threshold. However, some embodiments of the method are used to dynamically modify other criteria such as packet delay thresholds, jitter thresholds, combinations of the thresholds, and the like. A first flow has been previously connected to the communication system, e.g., according to the portions 400, 500 of the method shown in FIGS. 4 and 5. The flow is therefore carried via one or more access channels. Some embodiments of the method are performed concurrently with the method 600 shown in FIG. 6.

At block 705, variables used for the dynamic modification of the path modification criteria are initialized. The method utilizes the variable t_cur to keep track of the current system time throughout the entire development cycle. Another time variable called t_ref is used to establish time references whenever necessary. The network controller sets t_ref=t_cur during initialization.

In some embodiments, a number of measurement samples are taken during a warmup measurement interval referred to as warmup_interval, which is on the order of a few seconds in some cases. During this warmup interval, a number of measurement samples are gathered, where each measurement sample is taken over a warmup (or ramping up) measurement sampling interval denoted by $\Delta T1$, which can be the same or different from the regular measurement sampling interval, which is denoted by $\Delta T$. As a reference example, $\Delta T1$=dT=500 ms.

The existing flow is associated with quality requirement characteristics, such as a minimum required throughput target defined as "min_Thp_Thresh_Qual". The variable "min_Thp_Thresh_Temp" is used to keep track of the measured throughput for the flow and is initialized to "min_Thp_Thresh_Qual", i.e. min_Thp_Thresh_Temp=min_Thp_Thresh_Qual. Furthermore, the variable "min_Thp_Thresh_Temp" is dynamically adjusted over time and used to trigger path switching (or path consolidation) events whenever it is deemed necessary, as discussed herein.

The variable "nbr_Temp_Iterations" is used to keep track of counting events and is initialized to "nbr_Iterations", i.e. nbr_Temp_Iterations=nbr_Iterations, where the parameter "nbr_Iterations" is set to a constant value. For example, the network controller can set "nbr_Iterations" to the value resulting from dividing the time alarm interval (e.g., 3 sec) by the regular measurement sampling interval $\Delta T$ (e.g., 500 ms), which is equal to 6 in this example. This value is used to trigger a reload of initial values of some control variables introduced at this step, after a subsequent dynamic threshold adaptation phase, and to determine whether the connection monitoring was either in a normal phase or in a dynamic threshold adaptation phase.

The variable "var_Count" is used to keep track of throughput measurement samples within the targeted time alarm interval. Each throughput measurement sample is taken over a specific measurement time granularity $\Delta T1$ or dT (e.g., 500 ms) and triggers a counting event which increments the "var_Count". In the illustrated embodiment, path switching (or path consolidation) is triggered when "var_Count" is equal to "nbr_Iterations". The network controller initializes var_Count to 0, i.e. var_Count=0, and a temporary counting variable i is set to 1, i.e. i=1, during initialization.

In order to smooth out the throughput measurements, some embodiments of the network controller utilize a weighted average throughput to determine whether to perform path switching or consolidation. To assist the weighted throughput computation and the throughput comparison decisions, the network controller stores the latest set of measurement samples of size L into an array "weighted_Avg_Thrp[ ]" of size L. This is referred by the parameter thrp_Avg_Length, hence thrp_Avg_Length=L, where L=6 as a reference example. The value of the latest throughput measurement sample is stored in the variable weighted_Avg_Thrp[L], the second to last is stored in the variable weighted_Avg_Thrp[L−1], and so on, until the (L−1)-th to last is stored in the variable weighted_Avg_Thrp[1]. Once initialization is complete, all the elements of the array are set to 0, i.e. weighted_Avg_Thrp[j]=0 for any integer j between 1 and L. The method then flows to decision block 710.

At decision block 710, the network controller monitors the current time t_cur with respect to the reference time t_ref, which was initialized in block 705. If the difference between the two is lower than the threshold $\Delta T1$, the method flows to block 715, otherwise the method flows to decision block 720.

At block 715, the network controller obtains the throughput measurement sample thrp_i over the current i-th measurement interval of duration $\Delta T1$. At the end of the measurement interval $\Delta T1$, the method flows back to block 710 and a new time condition is tested.

At block 720, the network controller determines whether the current value of the temporary counting variable i is higher than (T1/$\Delta T1$−L). This comparison indicates whether the method is within the last L iterations before the end of the predetermined ramping up time interval T1. If so, the method flows to block 725, otherwise the method flows to decision block 730.

At block 725, the network controller sets the values of the weighted_Avg_Thrp[ ] array of L elements, where k is a temporary integer variable which takes values between 1 and L and represents the index of the elements in the array. The first value in the array corresponding to k=1 is set to the current throughput measurement sample thrp_i, i.e. weighted_Avg_Thrp[1]=thrp_i. The other values of the weighted_Avg_Thrp[ ] array are weighted between the current measurement sample thrp_i and the previous weighted value, i.e. weighted_Avg_Thrp[k]=A*thrp_i+B*weighted_Avg_Thrp[k−i] for any integer k between 2 and L. The parameter A and B determine the relative weights of the current and previous measurement samples and are set so that A+B=1. For instance, if A=1 and B=0, the weighted average is memoryless and is defined as the latest measurement sample. In another example, if A=B=0.5, the current and previous measurement samples have equal weights in determining the weighted average value. After completing these steps, the method flows to the decision block 730.

At decision block 730, the network controller determines whether the value of the temporary counting variable i is still smaller than T1/$\Delta T1$, which represents the number of throughput measurement samples that are obtainable within the warmup measurement sampling interval T1. If so, the method flows to block 735, otherwise the method flows to block 740.

At block 735, the network controller increments the temporary counting variable i, i.e. i=i+1, and the reference time variable t_ref is incremented by the warmup measurement sampling interval $\Delta T1$, t_ref=t_ref+$\Delta T1$, to start a new measuring sampling interval.

At block 740, the network controller updates the current weighted average throughput with the most recent value obtained at the latest iteration step i, i.e. weighted_Avg_Thrp_Cur=weighted_Avg_Thrp[i], and then the method flows to the node 4.

Figure 8:
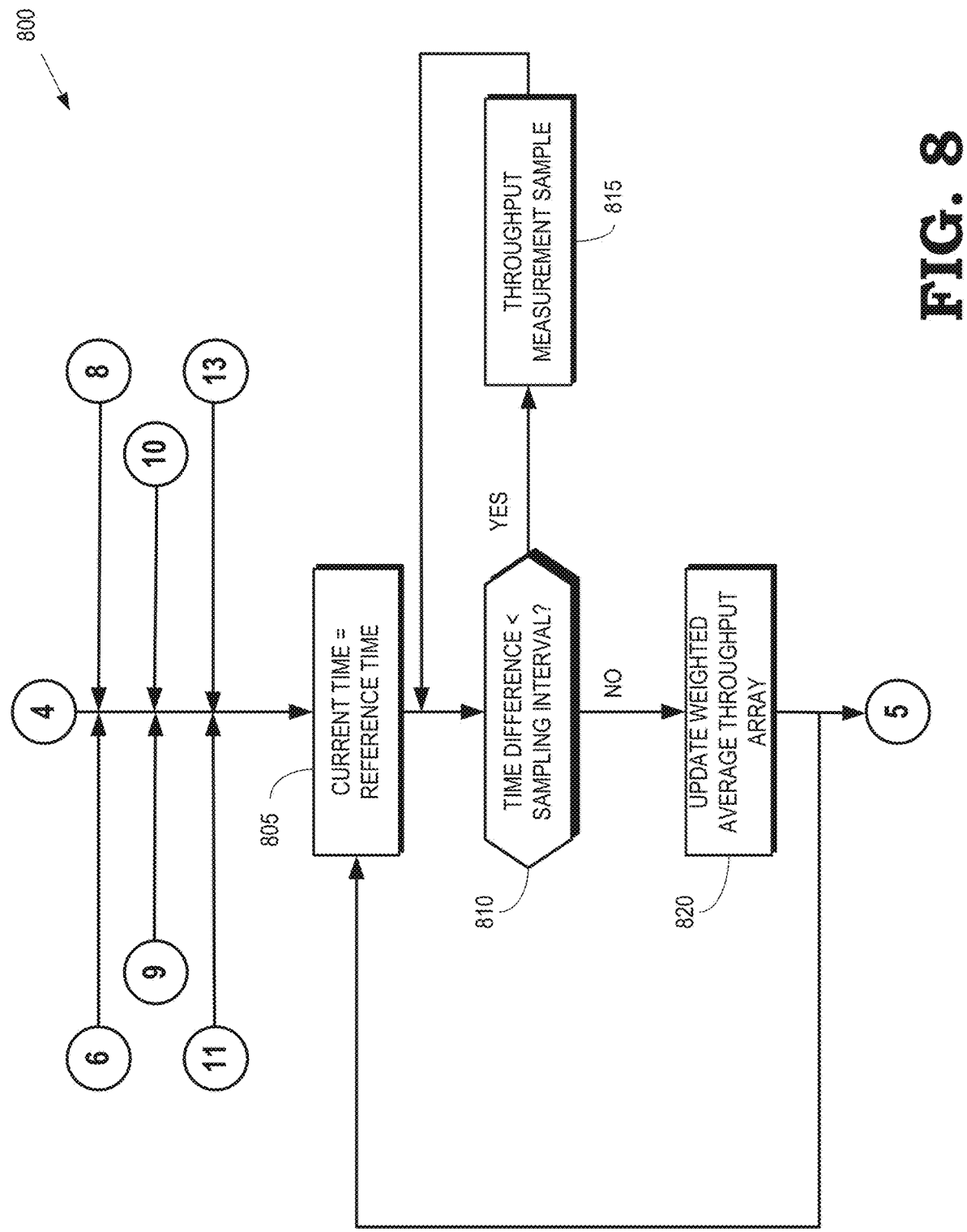
FIG. 8 is a flow diagram of a second portion of a method of dynamically modifying criteria for performing path reselection or path consolidation in a communication system that supports multiple paths using multiple access technologies according to some embodiments.

FIG. 8 is a flow diagram of a second portion 800 of a method of dynamically modifying criteria for performing path reselection or path consolidation in a communication system that supports multiple paths using multiple access technologies according to some embodiments. The method is implemented in a network controller such as some embodiments of the RCM 140 or the MPM 141 shown in FIG. 1 or the MPM 235 shown in FIG. 2. Node 4 provides one entry point to the second portion 800 of the method. The second portion 800 of the method is therefore linked to the first portion of the method 700 shown in FIG. 7 via the node 4. The nodes 6, 8, 9, 10, 11, and 13 also provide entry points to the second portion 800 of the method. The second portion 800 of the method is therefore linked to a third portion 900 of the method illustrated in FIG. 9, a fourth portion 1000 of the method illustrated in FIG. 10, and a fifth portion 1100 of the method illustrated in FIG. 11.

At block 805, the network controller stores the current time t_cur in the reference time variable t_ref, so that t_ref=t_cur. Setting the current time equal to the reference time marks the beginning of a new regular measuring sampling interval $\Delta T$, At decision block 810, the network controller monitors the current time t_cur and compares it against the reference time t_ref. If the difference between the current and the reference time is smaller than the regular measurement sampling interval $\Delta T$, so that t_cur−t_ref<$\Delta T$, the method flows to block 815, otherwise the method flows to block 820.

At block 815, the network controller obtains the throughput measurement sample thrp_$\Delta T$ over the current measurement sampling interval of duration $\Delta T$. At the end of the measurement sampling interval $\Delta T$, the method flows back to the decision block 810 and a new time condition is tested.

At block 820, the network controller updates the weighted_Avg_Thrp array by sliding the whole array by one position to capture the latest measurement sample. In the illustrated embodiment, for any value of the index k of the array between 1 and L−1, the value of the element weighted_Avg_Thrp[k] is overwritten by the value of the element weighted_Avg_Thrp[k+1]. This is done to ensure proper overwriting across the elements of the array. The latest weighted throughput value of the array weighted_Avg_Thrp[L] is updated according to a preferred weighting function to account for the latest throughput measurement sample thrp_$\Delta T$ over the latest regular measurement sampling interval $\Delta T$, i.e. weighted_Avg_Thrp[L]=A*thrp_$\Delta T$+B*weighted_Avg_Thrp[L−1]. As introduced before, the parameters A and B determine the relative weights of the current and previous measurement samples, and are set so that A+B=1. Finally, the network controller updates the current weighted average throughput with the latest weighted throughput value of the array weighted_Avg_Thrp[L], i.e. weighted_Avg_Thrp_Cur=weighted_Avg_Thrp[L]. After completing the operations at block 820, the network controller reaches a branch. On one hand, the method flows to block 805 and begins a new regular measuring sampling interval $\Delta T$. On the other hand, the method flows to node 5. The network controller can therefore be executing different portions of the method concurrently.

Figure 9:
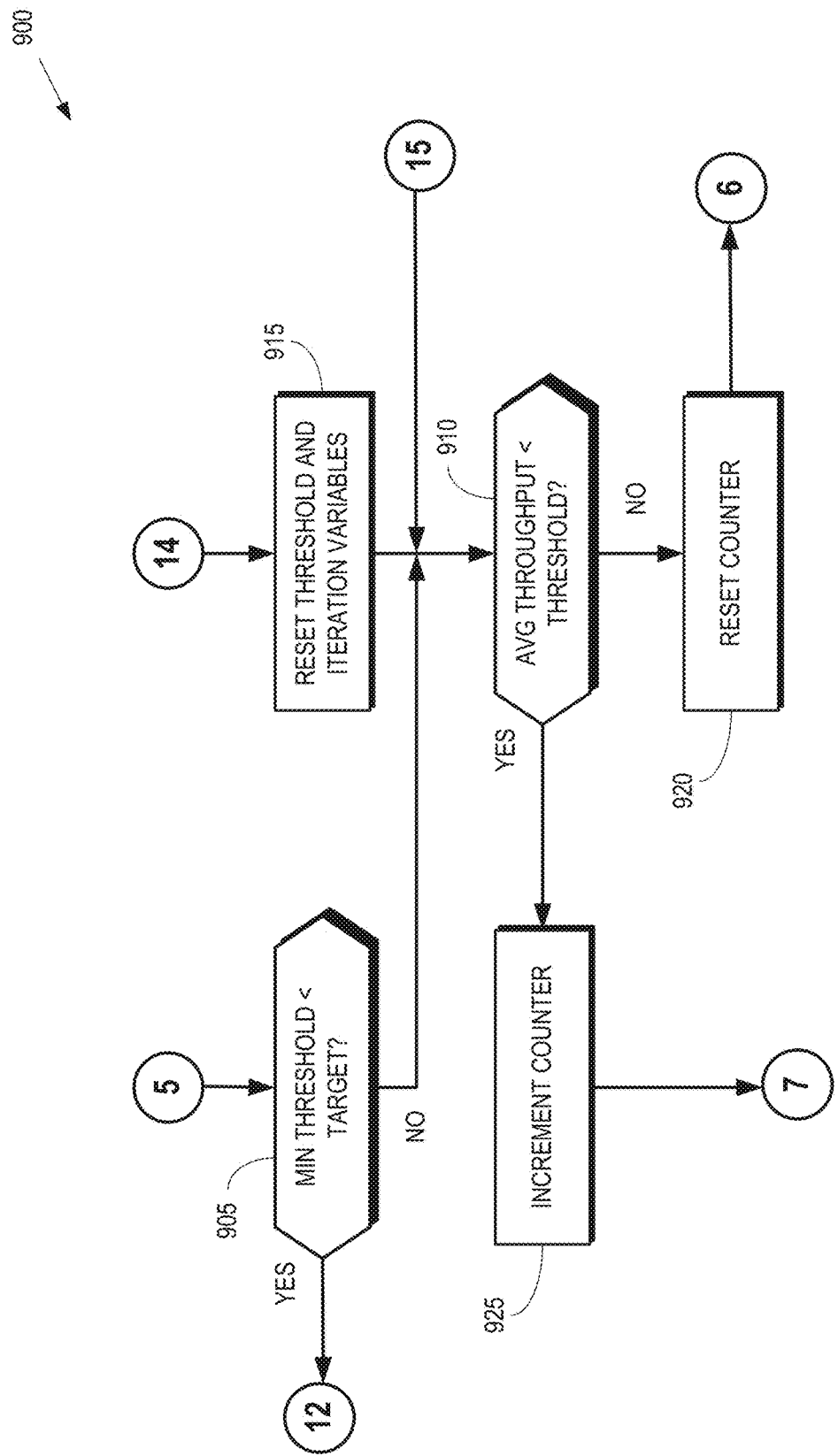
FIG. 9 is a flow diagram of a third portion of a method of dynamically modifying criteria for performing path reselection or path consolidation in a communication system that supports multiple paths using multiple access technologies according to some embodiments.

FIG. 9 is a flow diagram of a third portion 900 of a method of dynamically modifying criteria for performing path reselection or path consolidation in a communication system that supports multiple paths using multiple access technologies according to some embodiments. The method is implemented in a network controller such as some embodiments of the RCM 140 or the MPM 141 shown in FIG. 1 or the MPM 235 shown in FIG. 2. Node 5 provides one entry point to the second portion 800 of the method. The third portion 900 of the method is therefore linked to the second portion 800 of the method shown in FIG. 8 via the node 5. The nodes 14 and 15 also provide entry points to the third portion 900 of the method, which is therefore linked to the fifth portion 1100 of the method shown in FIG. 11.

At block 905, the network controller compares the current min_Thrp_Thresh_Temp against the minimum required throughput target min_Thrp_Thresh_Qual for the current service flow. If min_Thrp_Thresh_Temp is smaller than min_Thrp_Thresh_Qual, the network controller determines that the current measured throughput for the service flow does not meet the minimum quality requirements and the method flows to node 12. If the network controller determines that min_Thrp_Thresh_Temp is not smaller than min_Thrp_Thresh_Qual, the method flows to decision block 910.

At block 915, the network controller resets the values for the variables min_Thp_Thresh_Temp and nbr_Temp_Iterations, with the same setting that the network controller used for initialization at block 705 of FIG. 7, i.e. min_Thp_Thresh_Temp=min_Thp_Thresh_Qual and nbr_Temp_Iterations=nbr_Iterations. This indicates that the temporary quality threshold for the current service flow was not reduced compared to the minimum required throughput target, and method flows to decision block 910. This marks the end of the dynamic threshold adaptation phase.

At decision block 910, the network controller determines whether the current value of the weighted_Avg_Thrp_Cur is below min_Thrp_Thresh_Temp, i.e. whether weighted_Avg_Thrp_Cur<min_Thrp_Thresh_Temp. If this is the case, the network controller determines that the latest weighted throughput measurement sample does not satisfy the quality criteria for the current service flow and the method flows to block 920, otherwise the method flows to block 925.

At block 920, the network controller has determined that there are no quality concerns for the current service flow at this point in time. Therefore, the network controller resets the variable var_Count, i.e. var_Counter=0. The method then flows to block 805 shown in FIG. 8 via the node 6.

At block 925, the network controller has determined that the latest weighted throughput measurement sample is below the quality threshold for the current service flow. The network controller therefore increments the variable that keeps track of the occurrences of such quality violations, var_Counter, i.e. the network controller increments var_Counter=var_Counter+1. The method then flows to node 7.

Figure 10:
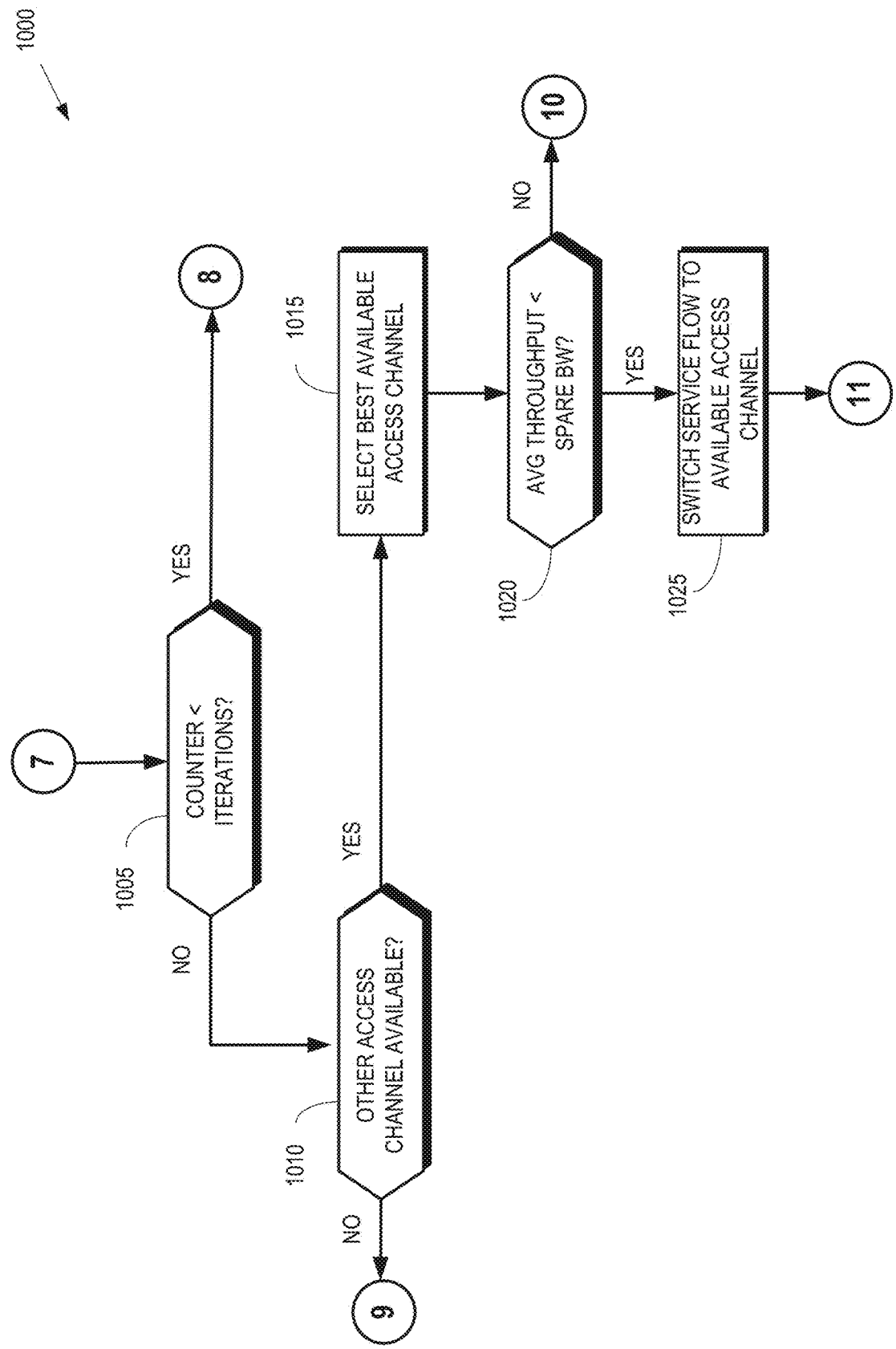
FIG. 10 is a flow diagram of a fourth portion of a method of dynamically modifying criteria for performing path reselection or path consolidation in a communication system that supports multiple paths using multiple access technologies according to some embodiments.

FIG. 10 is a flow diagram of a fourth portion 1000 of a method of dynamically modifying criteria for performing path reselection or path consolidation in a communication system that supports multiple paths using multiple access technologies according to some embodiments. The method is implemented in a network controller such as some embodiments of the RCM 140 or the MPM 141 shown in FIG. 1 or the MPM 235 shown in FIG. 2. Node 7 provides one entry point to the fourth portion 1000 of the method. The fourth portion 1000 of the method is therefore linked to the third portion 900 of the method shown in FIG. 9 via the node 7.

At block 1005, the network controller determines whether the current number of throughput measurement violations, which is stored in the variable var_Count, is lower than the current number of iterations allowed to keep the service flow on the access channel(s) the service flow is currently attached to, i.e. var_Counter<nbr_Temp_Iterations. If this is the case, the method flows to block 805 shown in FIG. 8 via node 8. Otherwise, the method flows to decision block 1010.

At block 1010, the network controller has determined that all the measurement samples yield unsatisfactory results. Therefore, the network controller determines whether other access channels are available to serve the reference service flow. If so, the method flows to block 1015. Otherwise, the method flows to block 805 shown in FIG. 8 via node 9.

At block 1015, the network controller selects the best available access channel. Some embodiments of the network controller select the access channel with the highest estimated spared bandwidth, new_Ch_Est_Spare_BW, as the best available channel. The method then flows to decision block 1020.

At decision block 1020, the network controller determines whether the latest weighted throughput measurement sample, weighted_Avg_Thrp_Cur, is lower than the estimated spared bandwidth of the best available access channel, new_Ch_Est_Spare_BW. If so, the network controller determines that there is sufficient bandwidth on the newly found access channel to accommodate the reference service flow while fulfilling its QoS requirements and the method flows to block 1025. However, if the network controller determines that there is no alternate access channel to switch to, the network controller keeps the flow on the current access channel and the method flows to block 805 shown in FIG. 8 via node 10.

At block 1025, the network controller switches or redirects the reference service flow to the newly found available access channel. The network controller also performs the following operations:

min_Thrp_Thresh_Temp=weighted_Avg_Thrp_Cur;

dynamic_Counter=0;

$nbr\_Temp\_Iterations = nbr\_Temp\_Iterations * SF;$ where SF is a sensitivity factor which may either increase or decrease the targeted alarm duration during the dynamic threshold adaptation. The adjusted values of these variables are used during the dynamic threshold adaptation. The method then flows to block 805 shown in FIG. 8 via node 11.

Figure 11:
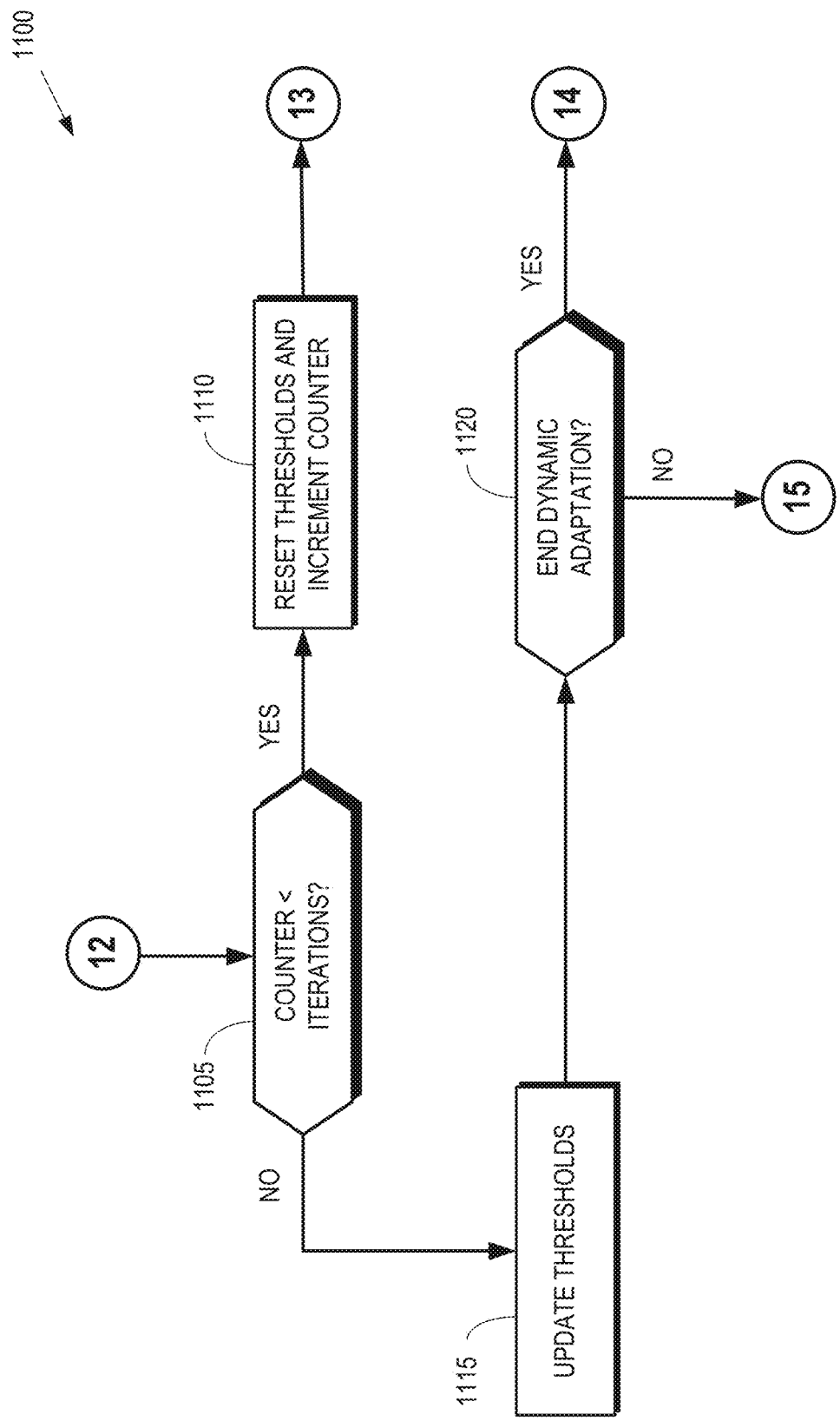
FIG. 11 is a flow diagram of a fifth portion of a method of dynamically modifying criteria for performing path reselection or path consolidation in a communication system that supports multiple paths using multiple access technologies according to some embodiments.

FIG. 11 is a flow diagram of a fifth portion 1100 of a method of dynamically modifying criteria for performing path reselection or path consolidation in a communication system that supports multiple paths using multiple access technologies according to some embodiments. The method is implemented in a network controller such as some embodiments of the RCM 140 or the MPM 141 shown in FIG. 1 or the MPM 235 shown in FIG. 2. Node 12 provides one entry point to the fifth portion 1100 of the method. The fifth portion 1100 of the method is therefore linked to the third portion 900 of the method shown in FIG. 9 via the node 12.

At block 1105, the network controller determines whether the current value of the dynamic Counter variable is lower than the nbr_Temp_Iterations, i.e. dynamic_Counter<nbr_Temp_Iterations. If so, the method flows to block 1110, otherwise the method flows to block 1115.

At block 1110, the network controller resets the value of the min_Thrp_Thresh_Temp to the minimum value between the current min_Thrp_Thresh_Qual and weighted_Avg_Thrp_Cur, i.e. the network controller sets min_Thrp_Thresh_Temp=min(min_Thrp_Thresh_Qual, weighted_Avg_Thrp_Cur). The network controller then increments the dynamic_Counter, i.e. the network controller sets dynamic_Counter=dynamic_Counter+1. The method then flows back to block 805 shown in FIG. 8 via the node 13.

At block 1115, the network controller updates threshold values. In the illustrated embodiment, the network controller computes the lowest value out of the whole weighted_Avg_Thrp[ ] array, which is stored in the variable lowest_Temp_Thrp. Then, if the variable lowest_Temp_Thrp is higher than min_Thrp_Thresh_Temp, the min_Thrp_Thresh_Temp is updated with the value of lowest_Temp_Thrp. i.e. min_Thrp_Thresh_Temp=lowest_Temp_Thrp. The method then flows to decision block 1120.

At decision block 1120, the network controller determines whether the dynamic threshold adaptation phase is coming to its end by comparing min_Thrp_Thresh_Temp against min_Thrp_Thresh_Qual. If the network controller determines that min_Thrp_Thresh_Temp is smaller than min_Thrp_Thresh_Qual, the method stays in the dynamic threshold adaptation phase and flows to decision block 910 shown in FIG. 9 via the node 15. Otherwise, the network controller terminates the dynamic threshold adaptation phase and the method flows to block 915 in FIG. 9 via the node 14.

Embodiments of the intelligent traffic steering techniques disclosed herein have a number of advantages over conventional techniques for utilizing multiple access technologies and communication systems. Simulations of the intelligent traffic steering technique have demonstrated improvements in reliability and throughput using realistic traffic models for FTP and Internet gaming applications using two available access technologies: LTE and Wi-Fi. The simulation makes the following assumptions:

The LTE access channel has a 20 MHz bandwidth, while the Wi-Fi access channel has a 40 MHz bandwidth.

There are 14 UEs (mobile devices) which are doing FTP downloads, where the file size is 20 MB and the FTP traffic model follows a session inter-arrival time distribution which is Uniform [15 sec, 25 sec].

There are 6 UEs (mobile devices) which perform Internet Gaming, where the average traffic demand for the uplink direction is sized to 2.5 Mbps and for the downlink is sized to 3 Mbps.

Under these assumptions, traffic steering dynamically distributes the FTP and gaming traffic over LTE and Wi-Fi.

Figures 12, 13:
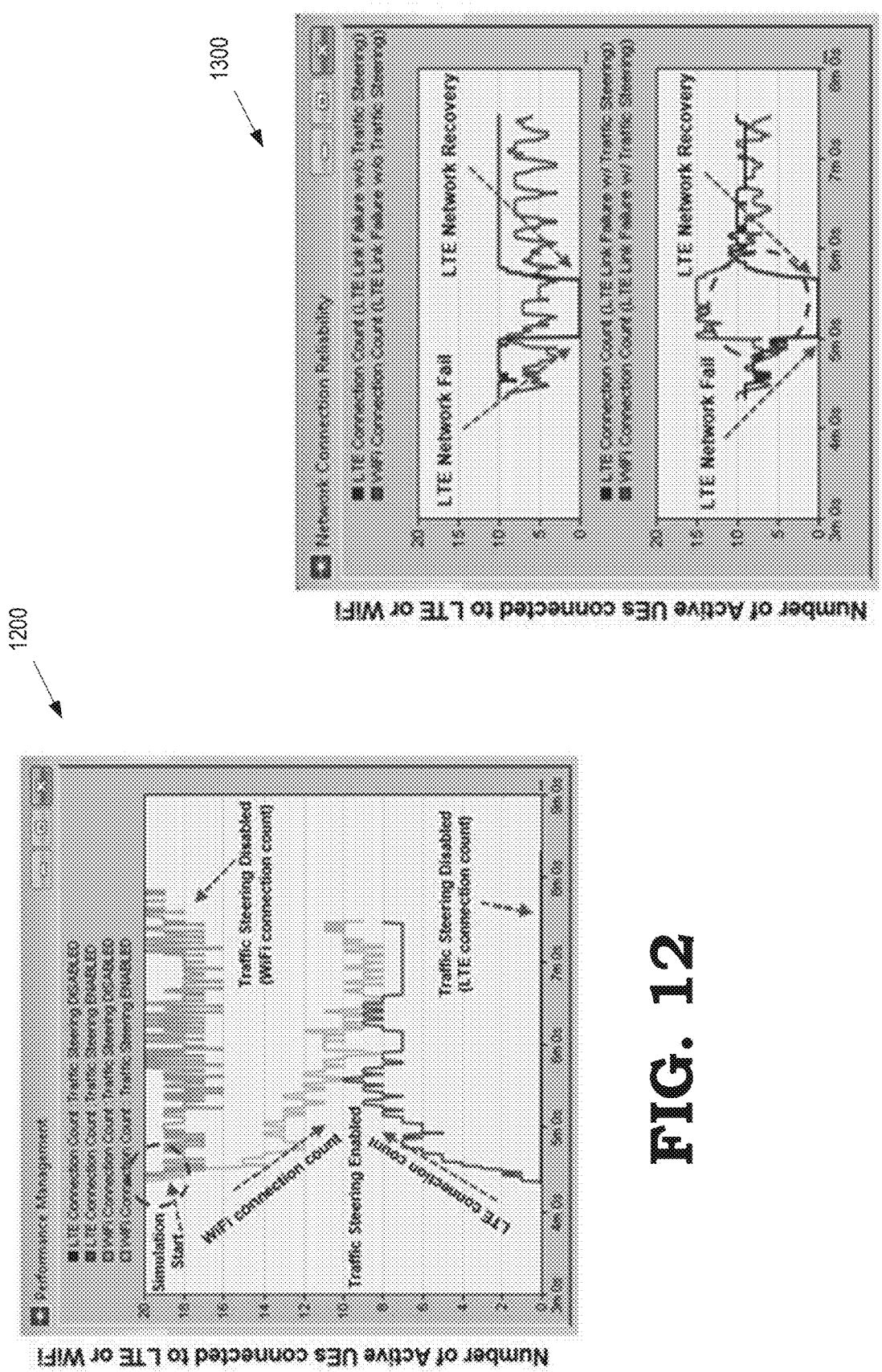
FIG. 12 illustrates results that indicate numbers of active user equipment that are connected to LTE or Wi-Fi according to some embodiments.
FIG. 13 illustrates results that demonstrate reliability of intelligent traffic steering according to some embodiments.

FIG. 12 illustrates results 1200 that indicate numbers of active user equipment that are connected to LTE or Wi-Fi according to some embodiments. The vertical axis indicates a number of connected user equipment and the horizontal axis indicates time increasing from left to right. The results 1200 demonstrate that when traffic steering is enabled according to embodiments of the techniques disclosed herein, traffic is dynamically distributed between LTE and Wi-Fi. For example, with traffic steering enabled, the initial distribution of user equipment is concentrated on Wi-Fi. As time increases, the distribution of user equipment becomes more balanced and nearly equal numbers of user equipment are connected to LTE and Wi-Fi.

FIG. 13 illustrates results 1300 that demonstrate reliability of intelligent traffic steering according to some embodiments. The vertical axis indicates a number of connected user equipment and the horizontal axis indicates time increasing from left to right. The LTE network fails at approximately five minutes and then recovers less than a minute later. If intelligent traffic steering is not enabled, the number of user equipment connected to Wi-Fi remains approximately the same during the failure interval, which indicates that user equipment attached to the LTE network are dropped and lose their connections. However, if intelligent traffic steering is enabled, LTE traffic is switched to Wi-Fi during the failure time interval. The traffic is switched back to LTE when LTE recovers from the failure. Thus, a network that implements embodiments of intelligent traffic steering as discussed herein is more reliable than a traffic that does not implement intelligent traffic steering.

Figure 14:
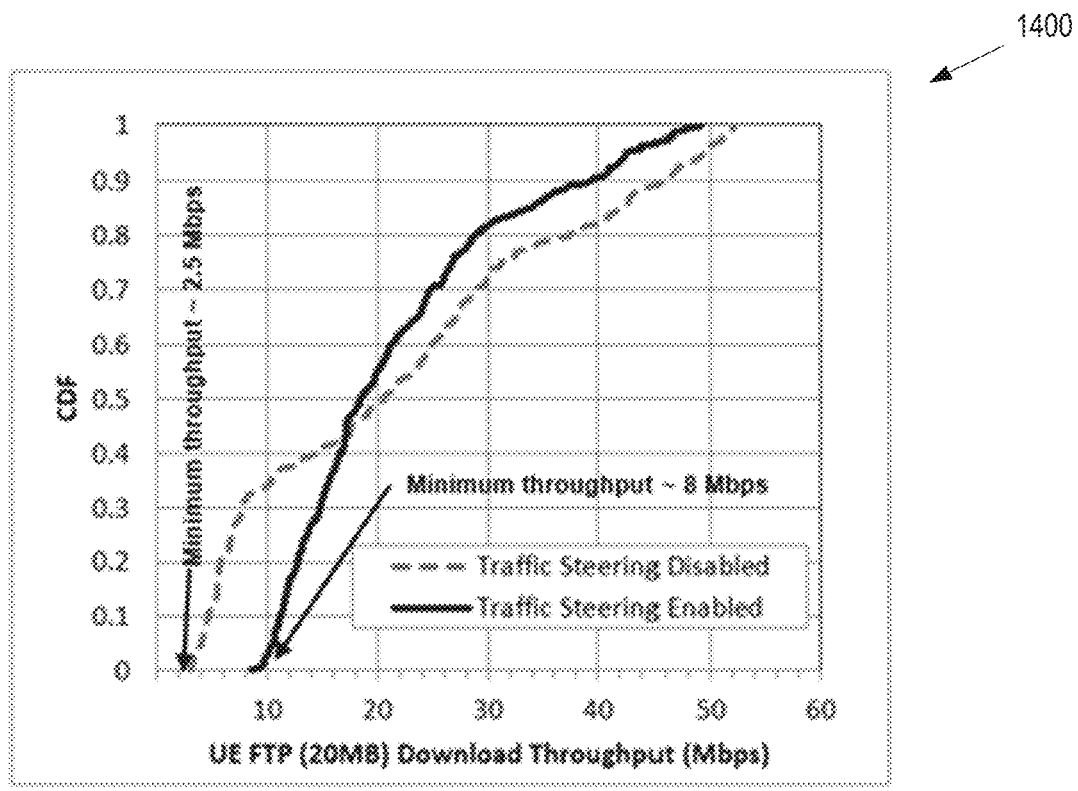
FIG. 14 illustrates a cumulative distribution function (CDF) of the throughput for an FTP download according to some embodiments.

FIG. 14 illustrates a cumulative distribution function (CDF) 1400 of the throughput for an FTP download according to some embodiments. The vertical axis indicates the CDF and the horizontal axis indicates the FTP download throughput in Mbps. The entire load is initially equally distributed between LTE and Wi-Fi. When traffic steering is enabled, the traffic steering threshold is set to 6 Mbps, which is reflected in the CDF 1400. For example, when traffic steering is enabled, the entire throughput distribution is above the switching threshold. Enabling intelligent traffic steering according to embodiments of the techniques disclosed herein therefore results in a significant difference in minimum throughput: 2 Mbps when traffic steering is not enabled and 8 Mbps when traffic steering is enabled.

Figure 15:
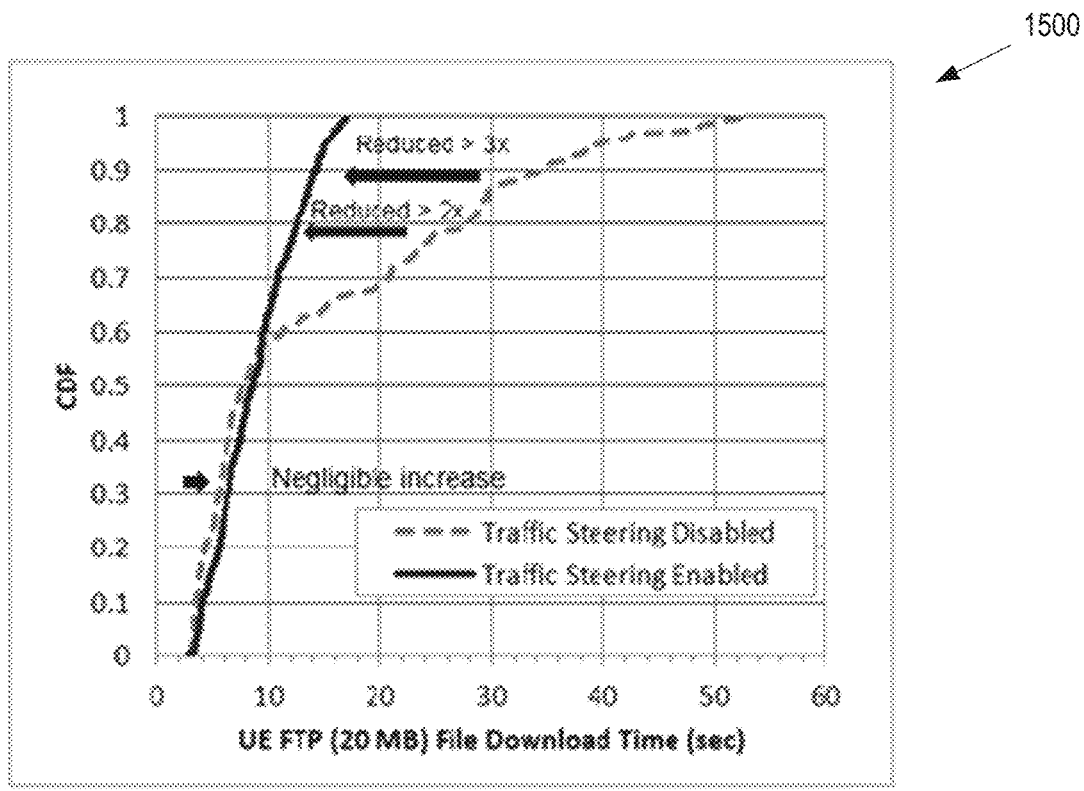
FIG. 15 illustrates a CDF of the throughput for an FTP download time with and without intelligent traffic steering according to some embodiments.

FIG. 15 illustrates a CDF 1500 of the download time for an FTP download with and without intelligent traffic steering according to some embodiments. The vertical axis indicates the CDF and the horizontal axis indicates the FTP download time in second. Intelligent traffic steering reduces the average FTP download time by a factor of two compared to the average FTP download times when traffic steering is not enabled.

Figure 16:
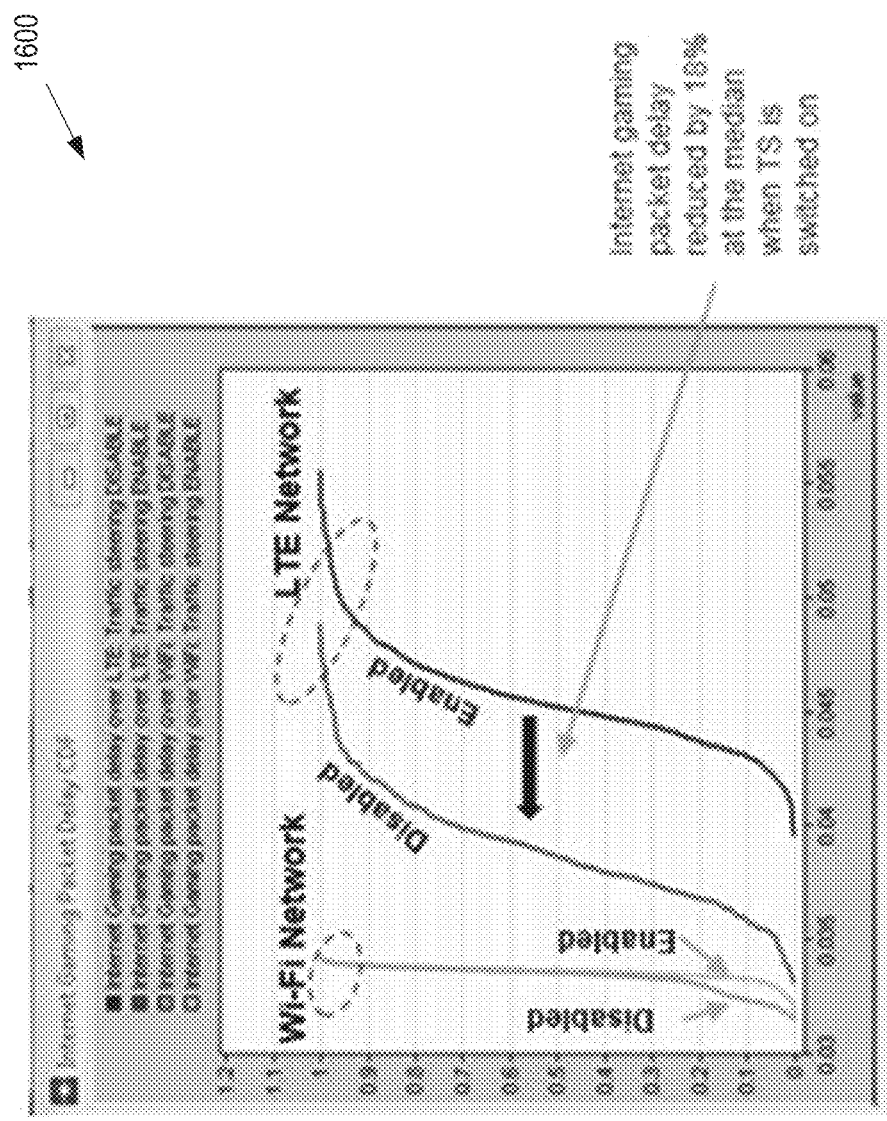
FIG. 16 illustrates a CDF of packet delays for an Internet gaming application according to some embodiments.

FIG. 16 illustrates a CDF 1600 of packet delays for an Internet gaming application according to some embodiments. The vertical axis indicates the CDF and the horizontal axis indicates packet delays in the seconds. Intelligent traffic steering according to some embodiments of the techniques described herein reduces the median packet delay for Internet gaming applications by 18% relative to the median packet delay when traffic steering is not enabled.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    assigning one of a plurality of available access channels to a service flow between a communication device and a core network, wherein the plurality of available access channels have at least one of sufficient bandwidth or acceptable latency to accommodate the service flow, and wherein the plurality of available access channels use a plurality of connectivity paths supported by a plurality of access technologies;
    modifying, based on monitoring at least one of network conditions or performance of the service flow on the one of the plurality of available access channels, one of the plurality of connectivity paths that supports the one of the plurality of available access channels;
    modifying criteria for modifying the one of the plurality of connectivity paths for a predetermined time interval in response to modifying the one of the plurality of connectivity paths; and
    modifying the one of the plurality of connectivity paths during the predetermined time interval in response to the modified criteria indicating that a previous modification of the one of the plurality of connectivity paths did not improve a quality-of-experience for the communication device.

2. The method of claim 1, wherein assigning the one of the plurality of available access channels to the service flow comprises allocating the one of the plurality of connectivity paths to the service flow based on at least one of an operator policy and a quality-of-service (QOS) requirement for the service flow.

3. The method of claim 2, wherein allocating the one of the plurality of connectivity paths to the service flow comprises allocating the one of the plurality of connectivity paths to the service flow based on at least one of an operator preference, a load balancing criterion, a service class, and a service cost.

4. The method of claim 2, wherein allocating the one of the plurality of connectivity paths to the service flow comprises allocating the one of the plurality of connectivity paths to the service flow based on at least one of bandwidth availability along the one of the plurality of connectivity paths, a packet delay along the one of the plurality of connectivity paths, and jitter along the one of the plurality of connectivity paths.

5. The method of claim 1, wherein assigning the one of the plurality of available access channels comprises assigning the one of the plurality of available access channels based on comparisons of available bandwidth on channels to a throughput threshold.

6. The method of claim 1, wherein assigning the one of the plurality of available access channels comprises assigning the one of the plurality of available access channels based on comparisons of measured packet delays and a delay threshold.

7. The method of claim 1, wherein assigning the one of the plurality of available access channels comprises sharing resources of the one of the plurality of available access channels between the service flow and at least one other service flow that was previously allocated to the one of the plurality of available access channels.

8. The method of claim 7, wherein sharing the resources of the one of the plurality of available access channels between the service flow and the at least one other service flow comprises taking a subset of the resources of the one of the plurality of available access channels away from the at least one other service flow and allocating the subset of the resources to the service flow in response to determining that a quality-of-service (QOS) or a quality-of-experience (QOE) of the at least one other service flow is not adversely affected by taking the subset of the resources.

9. The method of claim 1, wherein assigning the one of the plurality of available access channels comprises splitting the service flow across the plurality of available access channels in response to insufficient resources being available on any one access channel to support the service flow.

10. The method of claim 9, wherein splitting the service flow across the plurality of available access channels comprises splitting the service flow across the plurality of available access channels that provide an aggregate throughput that meets a target throughput requirement of the service flow.

11. The method of claim 9, wherein splitting the service flow across the plurality of available access channels comprises splitting the service flow across the plurality of available access channels to meet at least one of a target end to end packet delay or a jitter requirement of the service flow.

12. The method of claim 1, wherein monitoring the network conditions comprises monitoring at least one of an offered quality-of-service (QOS) per application class, radio channel conditions, number of connected devices, number of active devices, number of active sessions, radio resource availability or utilization levels, mobile device mobility, and mobile device capability.

13. The method of claim 1, wherein monitoring the performance comprises monitoring at least one of measurements of uplink throughput or downlink throughput, measurements of packet delay, measurements of bandwidth availability, and monitored radio conditions.

14. The method of claim 1, wherein modifying the one of the plurality of connectivity paths comprises at least one of: switching the one of the plurality of connectivity paths to at least one other access channel; and consolidating split portions of the service flow onto a single access channel.

15. The method of claim 1, wherein modifying the criteria for modifying the one of the plurality of connectivity paths comprises modifying threshold values that are used to determine whether to modify the one of the plurality of connectivity paths based on a comparison of the threshold values to at least one of the network conditions or the performance of the service flow.

16. The method of claim 15, wherein modifying the one of the plurality of connectivity paths during the predetermined time interval comprises modifying the one of the plurality of connectivity paths during the predetermined time interval in response to the comparison of the threshold values to at least one of the network conditions or the performance of the service flow indicating that the previous modification of the one of the plurality of connectivity paths did not improve a quality-of-experience for the communication device.

17. An apparatus comprising:
at least one processor configured to:
assign one of a plurality of available access channels to a service flow between a communication device and a core network, wherein the plurality of available access channels have at least one of sufficient bandwidth or acceptable latency to accommodate the service flow, and wherein the plurality of available access channels use a plurality of connectivity paths supported by a plurality of access technologies; and
networking hardware configured to monitor at least one of network conditions or performance of the service flow on the one of the plurality of available access channels,
wherein the at least one processor is configured to modify, based on the monitoring of the service flow, one of the plurality of connectivity paths that supports the one of the plurality of available access channels, modify criteria for modifying the one of the plurality of connectivity paths for a predetermined time interval in response to modifying the one of the plurality of connectivity paths, and modify the one of the plurality of connectivity paths during the predetermined time interval in response to the modified criteria indicating that a previous modification of the one of the plurality of connectivity paths did not improve a quality-of-experience for the communication device.

18. The apparatus of claim 17, wherein the at least one processor is configured to allocate the one of the plurality of connectivity paths to the service flow based on at least one of an operator policy and a quality-of-service (QOS) requirement for the service flow.

19. The apparatus of claim 18, wherein the at least one processor is configured to allocate the one of the plurality of connectivity paths to the service flow based on at least one of an operator preference, a load balancing criterion, a service class, and a service cost.

20. The apparatus of claim 18, wherein the at least one processor is configured to allocate the one of the plurality of connectivity paths to the service flow based on at least one of bandwidth availability along the one of the plurality of connectivity paths, a packet delay along the one of the plurality of connectivity paths, and jitter along the one of the plurality of connectivity paths.

21. The apparatus of claim 17, wherein the at least one processor is configured to assign the one of the plurality of available access channels based on comparisons of available bandwidth on channels to a throughput threshold.

22. The apparatus of claim 17, wherein the at least one processor is configured to assign the one of the plurality of available access channels based on comparisons of measured packet delays and a delay threshold.

23. The apparatus of claim 17, wherein the at least one processor is configured to allocate resources of the one of the plurality of available access channels for sharing between the service flow and at least one other service flow that was previously allocated to the one of the plurality of available access channels.

24. The apparatus of claim 23, wherein the at least one processor is configured to take a subset of the resources of the one of the plurality of available access channels away from the at least one other service flow and allocate the subset of the resources to the service flow in response to determining that a quality-of-service (QOS) or a quality-of-experience (QOE) of the at least one other service flow is not adversely affected by taking the subset of the resources.

25. The apparatus of claim 17, wherein the at least one processor is configured to split the service flow across the plurality of available access channels in response to insufficient resources being available on any one access channel to support the service flow.

26. The apparatus of claim 25, wherein the at least one processor is configured to split the service flow across the plurality of available access channels that provide an aggregate throughput that meets a target throughput requirement of the service flow.

27. The apparatus of claim 25, wherein the at least one processor is configured to split the service flow across the plurality of available access channels to meet at least one of a target end to end packet delay or a jitter requirement of the service flow.

28. The apparatus of claim 17, wherein the networking hardware is configured to monitor at least one of an offered quality-of-service (QOS) per application class, radio channel conditions, number of connected devices, number of active devices, number of active sessions, radio resource availability or utilization levels, mobile device mobility, and mobile device capability.

29. The apparatus of claim 17, wherein the networking hardware is configured to monitor at least one of measurements of uplink throughput or downlink throughput, measurements of packet delay, measurements of bandwidth availability, and monitored radio conditions.

30. The apparatus of claim 17, wherein the at least one processor is configured to perform at least one of switching the one of the plurality of connectivity paths to at least one other available access channel and consolidating split portions of the service flow onto a single available access channel.

31. The apparatus of claim 17, wherein the at least one processor is configured to modify threshold values that are used to determine whether to modify the one of the plurality of connectivity paths based on a comparison of the threshold values to at least one of the network conditions or the performance of the service flow.

32. The apparatus of claim 31, wherein the at least one processor is configured to modify the one of the plurality of connectivity paths during the predetermined time interval in response to the comparison of the threshold values to at least one of the network conditions or the performance of the service flow indicating that the previous modification of the one of the plurality of connectivity paths did not improve a quality-of-experience for the communication device.

33. A method comprising:

assigning a first available access channel of a plurality of available access channels to a service flow between a communication device and a core network, wherein the plurality of available access channels have at least one of sufficient bandwidth or acceptable latency to accommodate the service flow, and wherein the one of the plurality of available access channels uses a first connectivity path of a plurality of connectivity paths supported by a plurality of access technologies;

monitoring at least one of network conditions or performance of the service flow on the one of the plurality of available access channels;

switching the service flow from the first available access channel on the first connectivity path to a second available access channel of the plurality of available access channels on a second connectivity path of the plurality of connectivity paths based on a comparison of a target performance metric to at least one of the network conditions or the performance of the service flow on the first connectivity path;

generating a dynamic temporary performance metric that varies during a ramping up time interval in response to switching the service flow from the first connectivity path to the second connectivity path; and determining whether to switch the service flow from the second connectivity path to a third connectivity path based on a comparison of the dynamic temporary performance metric to the network conditions and the performance of the service flow on the second connectivity path during the ramping up time interval.

\* \* \* \* \*